(12) United States Patent
Eiza et al.

(10) Patent No.: US 8,391,801 B2
(45) Date of Patent: Mar. 5, 2013

(54) RADIO EQUIPMENT CONTROLLER, BASE TRANSCEIVER STATION, AND METHOD FOR RELAYING DATA

(75) Inventors: Chie Eiza, Osaka (JP); Yoshimi Toyoda, Osaka (JP); Katsuaki Yamanaka, Osaka (JP); Yuki Iwamasa, Osaka (JP); Satoshi Maeda, Osaka (JP); Naoto Kawashima, Osaka (JP)

(73) Assignee: Fujitsu Limited, Kawasaki (JP)

( * ) Notice: Subject to any disclaimer, the term of this patent is extended or adjusted under 35 U.S.C. 154(b) by 279 days.

(21) Appl. No.: 12/836,756

(22) Filed: Jul. 15, 2010

(65) Prior Publication Data

US 2011/0014908 A1 Jan. 20, 2011

(30) Foreign Application Priority Data

Jul. 17, 2009 (JP) ................................. 2009-168874

(51) Int. Cl.
  *H04B 17/00* (2006.01)
(52) U.S. Cl. ..................................... 455/67.16; 370/338
(58) Field of Classification Search .................. 455/423; 370/338
  See application file for complete search history.

(56) References Cited

U.S. PATENT DOCUMENTS

| | | | |
|---|---|---|---|
| 6,118,765 A * | 9/2000 | Phillips | 370/235 |
| 2004/0057543 A1 | 3/2004 | Huijgen et al. | |
| 2007/0201392 A1 * | 8/2007 | Ramachandran | 370/315 |
| 2007/0281643 A1 | 12/2007 | Kawai | |
| 2011/0080878 A1 * | 4/2011 | Novak | 370/329 |

FOREIGN PATENT DOCUMENTS

| | | |
|---|---|---|
| EP | 1 699 148 | 9/2006 |
| JP | 2008-011498 | 1/2008 |
| WO | 2005/034544 | 4/2005 |
| WO | 2005/114890 | 12/2005 |

OTHER PUBLICATIONS

Hidehiko Oyane, et al. "Development of Wireless Base Transceiver Station for IP" NTT DoCoMo Technical Journal, vol. 15, No. 1 Apr. 2007.
European Search Report dated Nov. 18, 2010, from the corresponding European Application.

* cited by examiner

*Primary Examiner* — Marcos Batista
(74) *Attorney, Agent, or Firm* — Katten Muchin Rosenman LLP

(57) ABSTRACT

A Radio Equipment Controller connected, via a plurality of transmission paths, to a plurality of pieces of Radio Equipment for performing communication with a mobile station, and also connected to an upper-level device is provided. The Radio Equipment Controller includes a required time measurement portion that measures, for each piece of Radio Equipment, required time for the Radio Equipment and the Radio Equipment Controller to relay data that has a predetermined size and is transmitted and received between the upper-level device and the mobile station, and a relaying portion that relays target data that is data to be transmitted and received between the upper-level device and the mobile station by delaying a time to transmit the target data based on the required time for the Radio Equipment relaying the target data.

7 Claims, 20 Drawing Sheets

FIG. 5

| Purpose of Sub-Channe. | Sub-Channel Number Ns | Xs=0 | | | | Sub-Channel Number Ns | Xs=1 | | | | Sub-Channel Number Ns | Xs=2 | | | | Sub-Channel Number Ns | Xs=3 | | | |
|---|---|---|---|---|---|---|---|---|---|---|---|---|---|---|---|---|---|---|---|---|
| | | Y=0 | Y1 | Y=2 | Y=3 | | Y=0 | Y1 | Y=2 | Y=3 | | Y=0 | Y1 | Y=2 | Y=3 | | Y=0 | Y1 | Y=2 | Y=3 |
| Sync & Timing | 0 | K28.5 | +D16.2 D5.6 | D16.2 | D16.2 | 64 | HFN [7:0] | | | | 128 | BFN [7:0] | | | | 192 | BFN [11:8] | | | |
| Slow C & M Plane | 1 | | | | | | | | | | 129 | | | | | | | | | |
| L1 Inband Protocol | 2 | Version | | | | 66 | Start UP | | | | 130 | L1 Function | | | | 194 | Pointer | | | |
| Reserved | 3 | | | | | 67 | | | | | 131 | | | | | 195 | | | | |
| ... | ... | ... | ... | ... | ... | ... | ... | ... | ... | ... | ... | ... | ... | ... | ... | ... | ... | ... | ... | ... |
| Reserved | 15 | | | | | 80 | | | | | 144 | | | | | 208 | | | | |
| Vendor Specific | 17 | | | | | 81 | | | | | 145 | | | | | 209 | | | | |
| Vendor Specific | 18 | | | | | 82 | | | | | 146 | | | | | 210 | | | | |
| Vendor Specific | p−1 | | | | | | | | | | | | | | | | | | | |
| Fast C & M | p | | | | | | | | | | | | | | | | | | | |
| ... | ... | ... | ... | ... | ... | ... | ... | ... | ... | ... | ... | ... | ... | ... | ... | ... | ... | ... | ... | ... |
| Fast C & M | 63 | | | | | 127 | | | | | 191 | | | | | 255 | | | | |

FIG. 6

| Purpose of Sub-Channel | Sub-Channel Number Ns | Xs=0 Y=0 | Xs=0 Y1 | Sub-Channel Number Ns | Xs=1 Y=0 | Xs=1 Y1 | Sub-Channel Number Ns | Xs=2 Y=0 | Xs=2 Y1 | Sub-Channel Number Ns | Xs=3 Y=0 | Xs=3 Y1 |
|---|---|---|---|---|---|---|---|---|---|---|---|---|
| Sync & Timing | 0 | K28.5 | +D16.2 D5.6 | 64 | HFN [7:0] | | 128 | BFN [7:0] | | 192 | BFN [11:8] | |
| Slow C & M Plane | 1 | | | | | | 129 | | | | | |
| L1 Inband Protocol | 2 | Version | | 66 | Start UP | | 130 | L1 Function | | | | |
| Reserved | 3 | | | 67 | | | 131 | | | | | |
| ... | ... | ... | ... | ... | ... | ... | ... | ... | ... | 194 | Pointer | |
| | | | | | | | | | | 195 | | |
| Reserved | 15 | | | 80 | | | 144 | | | | | |
| Vendor Specific | 17 | | | 81 | | | 145 | | | 208 | | |
| Vendor Specific | 18 | | | 82 | | | 146 | | | 209 | | |
| Vendor Specific | p−1 | | | | | | | | | 210 | | |
| Fast C & M | p | | | | | | | | | | | |
| ... | ... | ... | ... | ... | ... | ... | ... | ... | ... | ... | ... | ... |
| Fast C & M | 63 | | | 127 | | | 191 | | | 255 | | |

FIG. 14
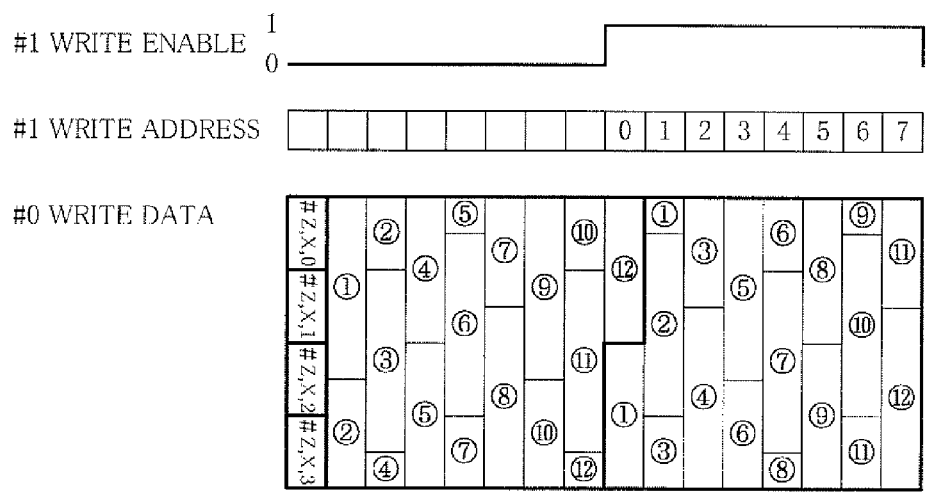
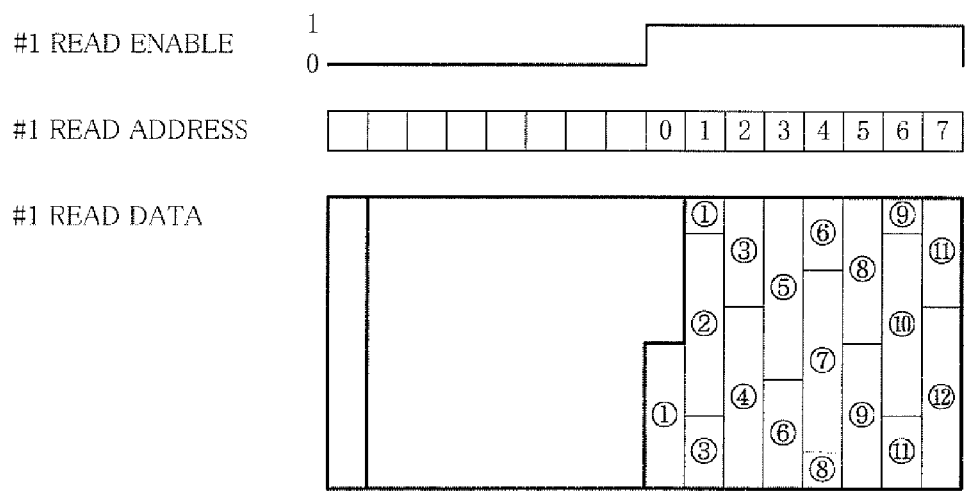

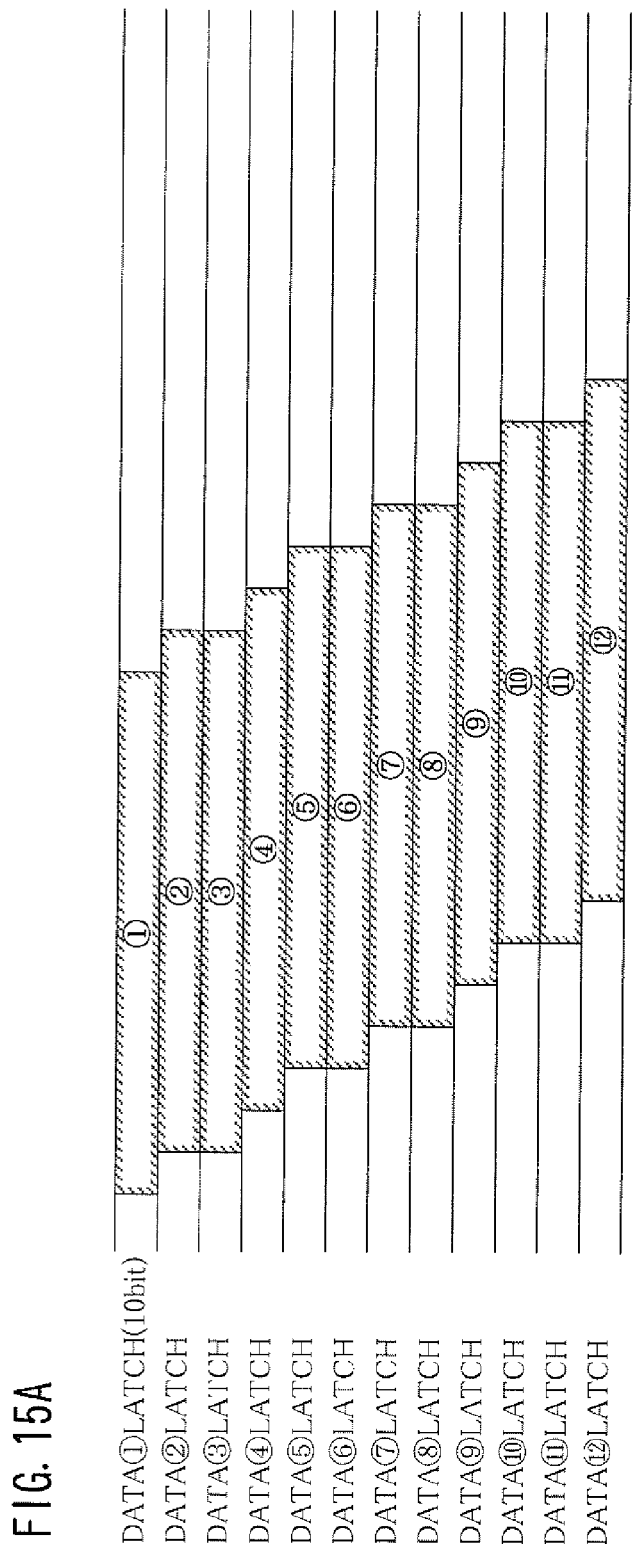

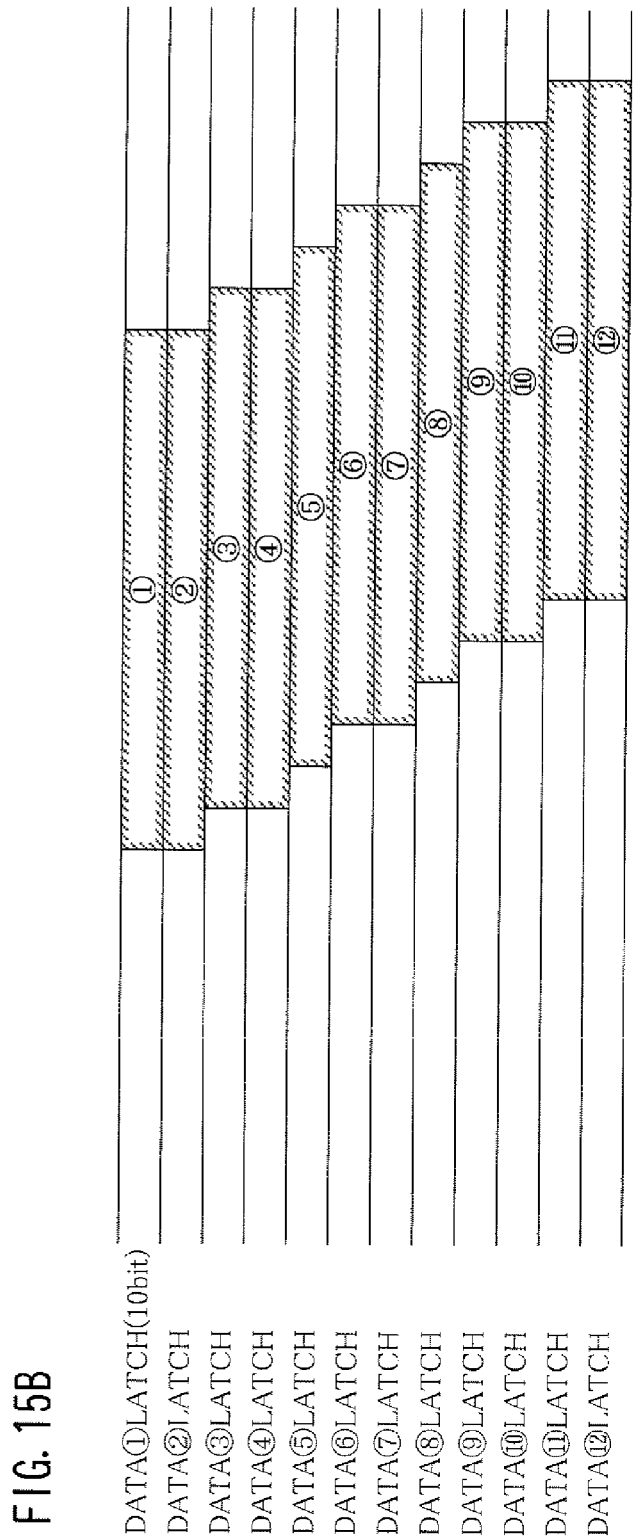

RADIO EQUIPMENT CONTROLLER, BASE TRANSCEIVER STATION, AND METHOD FOR RELAYING DATA

CROSS-REFERENCE TO RELATED APPLICATION

This application is based upon and claims the benefit of priority of the prior Japanese Patent Application No. 2009-168874, filed on Jul. 17, 2009, the entire contents of which are incorporated herein by reference.

FIELD

The embodiments discussed herein are related to a Base Transceiver Station and a Radio Equipment Controller used therein.

BACKGROUND

A Base Transceiver Station (BTS) is a device to connect a mobile station and a communication network, and is operable to relay data transmitted and received therebetween. In the case where the communication network is a mobile phone network, the Base Transceiver Station serves to relay, for example, data transmitted and received between a Radio Network Controller (RNC) of the mobile phone network and a mobile phone terminal. In the case where the communication network is a Local Area Network (LAN), the Base Transceiver Station serves to relay, for example, data transmitted and received between a router of the LAN and a personal computer.

In order to expand an area within which a user can use a mobile station, the number of Base Transceiver Stations is preferably increased. It is, however, sometimes difficult to secure a place offering sufficient space to install a Base Transceiver Station. If a Base Transceiver Station is installed at a hard-to-reach place for a maintenance staff, it is not easy for him/her to maintain the Base Transceiver Station.

There is proposed a method by which narrow space or a hard-to-reach place is used effectively. According to the method, a radio part for performing radio communication with a mobile station is separated from the body of a Base Transceiver Station, and the radio part is installed at the narrow space or the hard-to-reach place.

A radio part is connected to the body of a Base Transceiver Station via a cable such as an optical fiber. The Common Public Radio Interface (CPRI) standards are proposed as an interface between the radio part and the body of the Base Transceiver Station. According to the Common Public Radio Interface standards, the radio part is called Radio Equipment (RE). The body of the Base Transceiver Station is provided with a Radio Equipment Control (or Controller) (REC) for controlling the Radio Equipment. The Radio Equipment and the Radio Equipment Controller are connected to each other via an optical fiber to perform communication with each other according to a predetermined protocol.

Further, there is proposed a method by which one Radio Equipment Controller is used to control a plurality of pieces of Radio Equipment. As described above, the installation location of Radio Equipment is more flexible as compared to the conventional technique. Accordingly, the length of a cable between the Radio Equipment Controller and each piece of Radio Equipment differs depending on the installation location thereof. This causes the difference in transmission rate in transmission paths between the Radio Equipment Controller and the individual pieces of Radio Equipment.

To cope with this, a method is proposed in which phase differences of transmission paths are determined, signal delays of the individual transmission paths are compared, and the signal delays are adjusted to one another.

As for the background art discussed above, the following documents should be referred to: Japanese Laid-open Patent Publication No. 2008-011498; and "Development of IP-compatible radio Base Transceiver Station", published in NTT DoCoMo technical journal, Vol. 15, No. 1, issued on April 2007, edited by NTT DOCOMO, Inc., and written by Hidehiko OHYANE, Naoki NAKAMINAMI, Daisuke TANIGAWA, and Yoshitaka HIRAMOTO.

The Multiple Input Multiple Output (MIMO) technology has recently been proposed. The MIMO technology is to expand a band by combining a plurality of antennas with one another. A sending end transmits different types of data concurrently through the plurality of antennas. A receiving end receives the different types of data sent from the sending end through a plurality of antennas whose amount is the same as that of the antennas of the sending end, and combines the different types of data received. The band is, therefore, broadened artificially in accordance with the number of antennas.

The individual antennas of the receiving end are required to receive a plurality of pieces of data to be combined almost at the same time. This is because, if a delay occurs, the plurality of pieces of data received cannot be combined with one another. The sending side, therefore, is also required to transmit data through the individual antennas without any delay.

However, a conventional REC-RE type Base Transceiver Station such as that disclosed in Japanese Laid-open Patent Publication No. 2008-011498 is configured to cope only with a delay in a transmission path between a Radio Equipment Controller and each piece of Radio Equipment.

SUMMARY

According to an aspect of the invention (embodiment), a radio equipment controller is connected to a plurality of pieces of radio equipment for performing communication with a mobile station, and also connected to an upper-level device. The radio equipment controller is connected to the plurality of pieces of radio equipment via a plurality of transmission paths. The radio equipment controller includes a required time measurement portion that measures, for each piece of radio equipment, required time for the radio equipment and the radio equipment controller to relay data that has a predetermined size and is transmitted and received between the upper-level device and the mobile station, and a relaying portion that relays target data that is data to be transmitted and received between the upper-level device and the mobile station by delaying a time to transmit the target data based on the required time for the radio equipment relaying the target data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a control word for 32-bit range;

FIG. 6 is a diagram illustrating an example of a control word for 16-bit range;

FIG. 14 is a diagram illustrating an example of a time at which data is read out for the case of a phase delay;

FIGS. 15A and 15B are diagrams illustrating an example of a latch;

DESCRIPTION OF EMBODIMENTS

Preferred embodiments of the present invention will be explained with reference to accompanying drawings.

Figure 1:
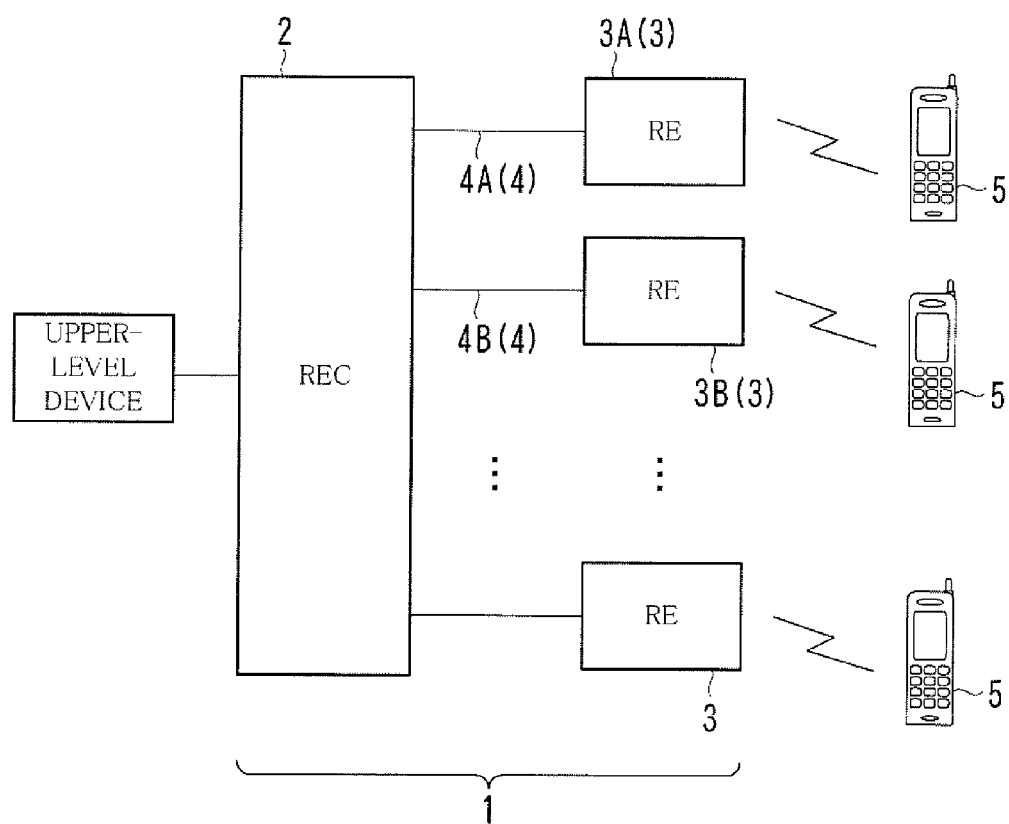
FIG. 1 is a diagram illustrating an example of the overall configuration of a Base Transceiver Station (BTS)
Figure 2:
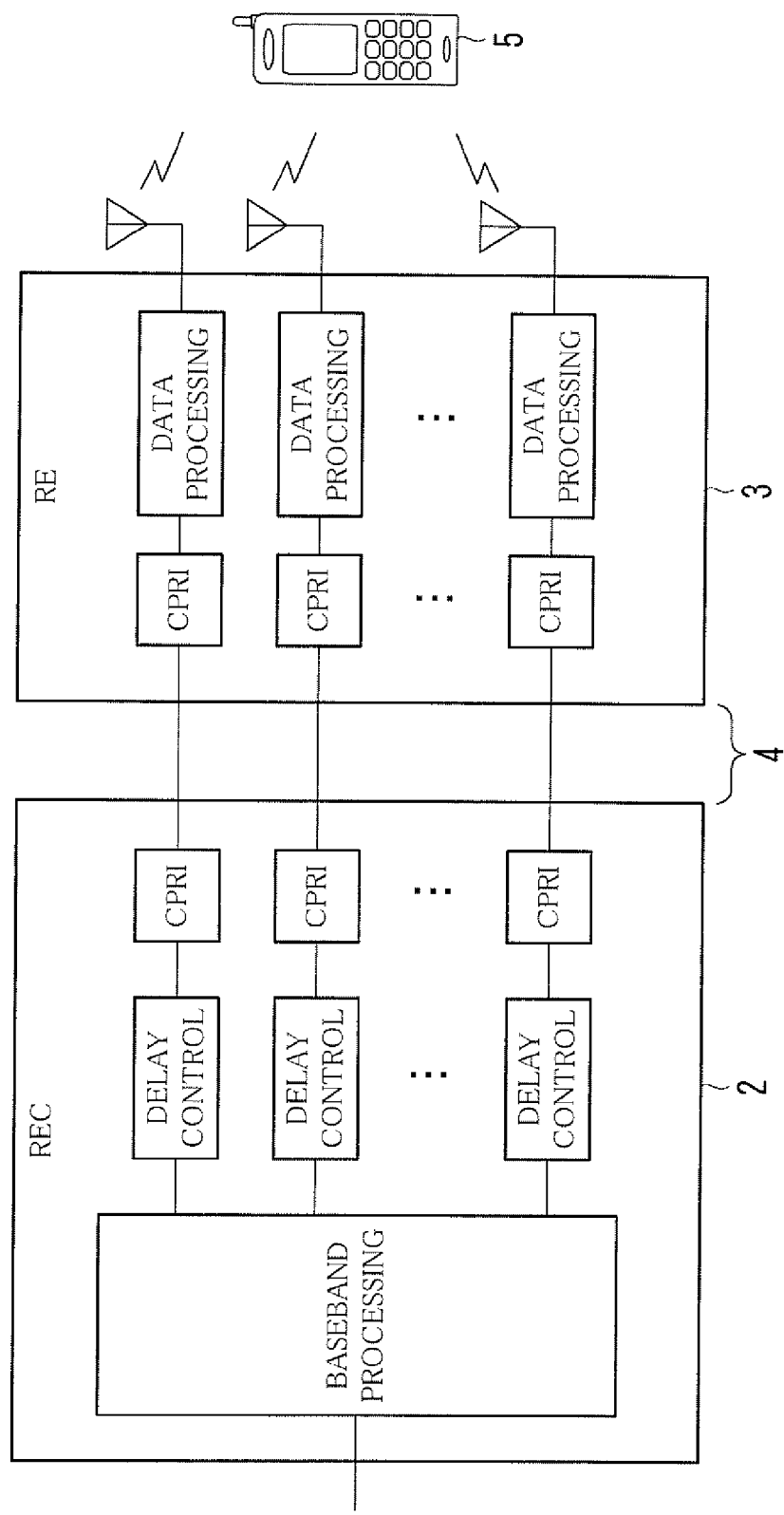
FIG. 2 is a diagram depicting the overall processes performed by a Radio Equipment Controller (REC) and Radio Equipment (RE)
Figure 3:
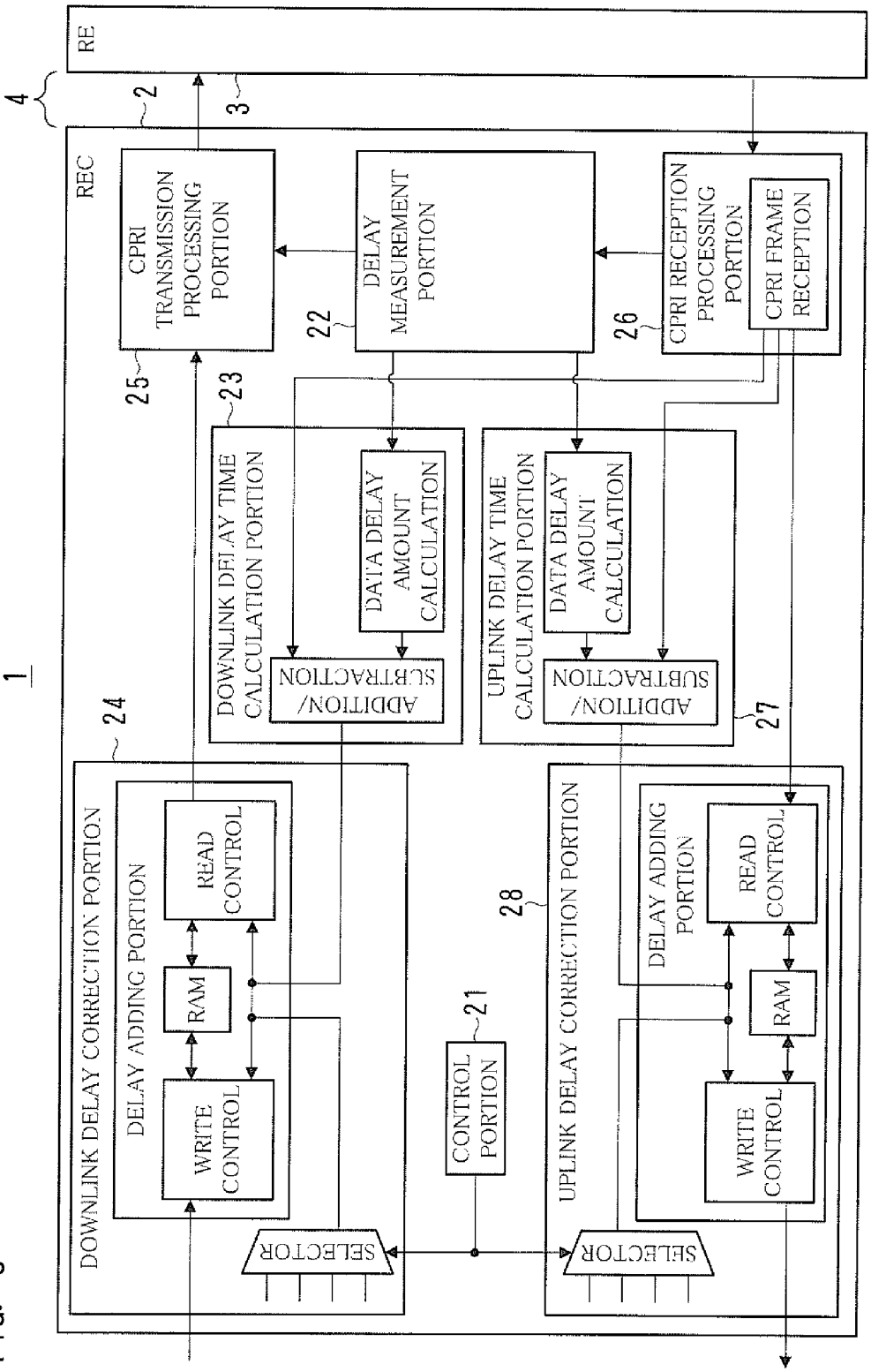
FIG. 3 is a diagram illustrating an example of the configuration of a Radio Equipment Controller.
Figure 4:
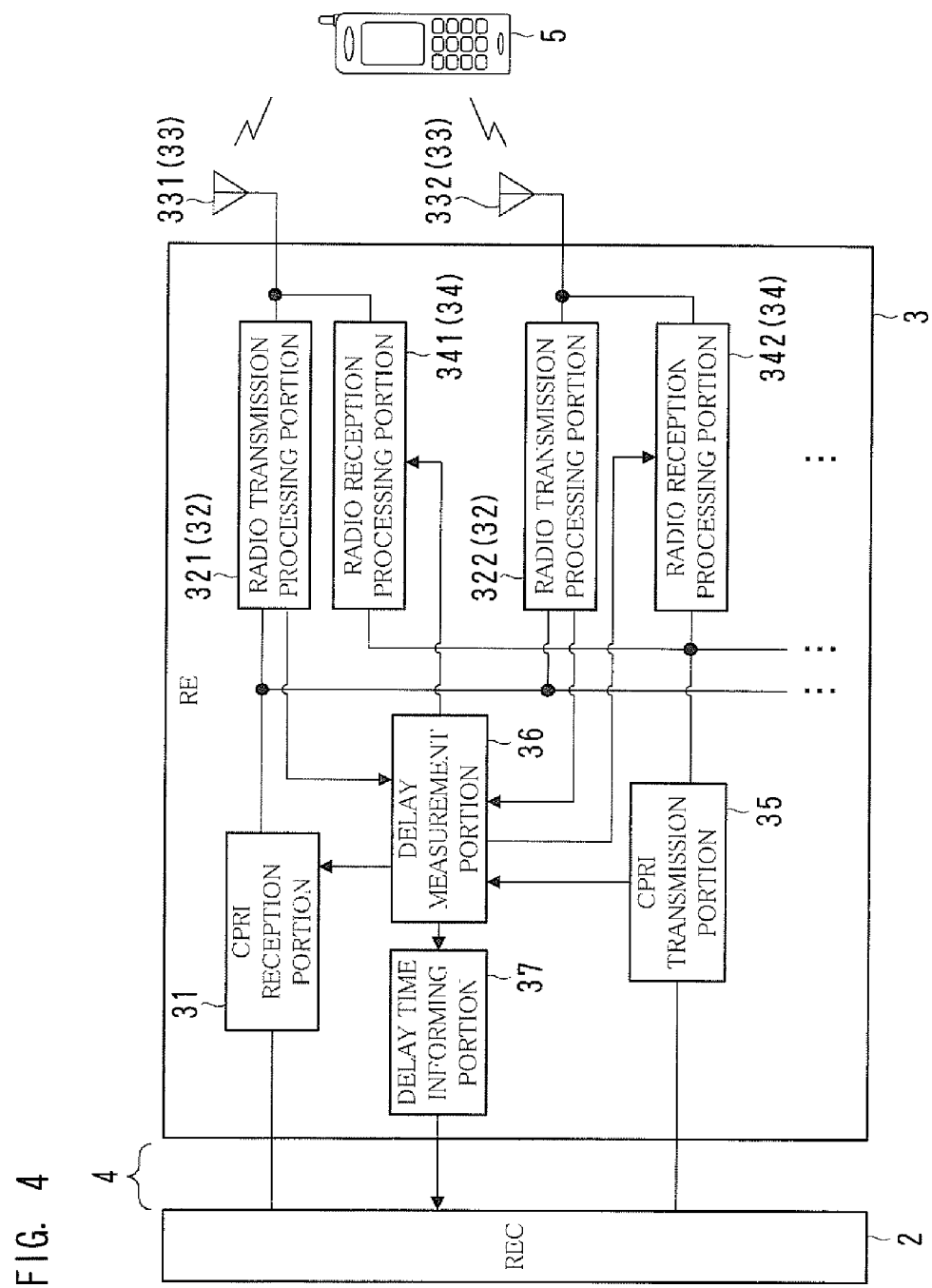
FIG. 4 is a diagram illustrating an example of the configuration of Radio Equipment.

FIG. 1 is a diagram illustrating an example of the overall configuration of a Base Transceiver Station (BTS) 1; FIG. 2 is a diagram depicting the overall processes performed by a Radio Equipment Controller (REC) 2 and Radio Equipment (RE) 3; FIG. 3 is a diagram illustrating an example of the configuration of the Radio Equipment Controller 2; and FIG. 4 is a diagram illustrating an example of the configuration of the Radio Equipment 3.

The Base Transceiver Station 1 illustrated in FIG. 1 serves to relay data transmitted and received between a communication network and mobile stations 5. In the case where the communication network is a mobile phone network, the Base Transceiver Station 1 serves to relay data transmitted and received between a Radio Network Controller (RNC) of the mobile phone network and the mobile stations 5. From the standpoint of the Base Transceiver Station 1, the communication network is located above (at a higher level than) the Base Transceiver Station 1, and the mobile stations 5 are located below (at a lower level than) the same.

The Base Transceiver Station 1 is configured of a Radio Equipment Controller 2, a plurality of pieces of Radio Equipment 3, transmission paths 4 for connecting the Radio Equipment Controller 2 to the individual pieces of Radio Equipment 3, and the like. Hereinafter, the individual pieces of Radio Equipment 3 are sometimes distinguished from one another as "Radio Equipment 3A", "Radio Equipment 3B", and so on. Likewise, the transmission paths 4 for connecting the Radio Equipment Controller 2 to the Radio Equipment 3A, the Radio Equipment 3B, and so on are sometimes distinguished from one another as a "transmission path 4A", a "transmission path 4B", and so on. The transmission path 4 is a cable such as an optical fiber.

The Radio Equipment 3 is a device to perform direct radio communication with a mobile station 5. The Radio Equipment 3 is provided with a plurality of antennas as described below, and is configured to perform communication with the mobile station 5 through the Multiple Input Multiple Output (MIMO) technique. The Radio Equipment Controller 2 is a device to control the individual pieces of Radio Equipment 3.

The following is a description as to how the Radio Equipment Controller 2 and the Radio Equipment 3 operate, with reference to FIG. 2. In the case of downlink communication, when receiving, from an upper-level device such as the RNC, data to be sent to the mobile station 5, the Radio Equipment Controller 2 performs baseband processing. The Radio Equipment Controller 2 divides the data into a plurality of frames, and transmits the individual frames to any of the plurality of pieces of Radio Equipment 3 through a Common Public Radio Interface (CPRI). Note that the Radio Equipment Controller 2 adjusts a time at which each frame is transmitted by delaying the time depending on the Radio Equipment 3 to which the frame is conveyed and the antennas used therein. In short, the Radio Equipment Controller 2 performs a delay control process.

When receiving a frame through the CPRI, the Radio Equipment 3 performs data processing such as Digital/Analog (D/A) conversion on the frame received, and transmits the frame wirelessly through the antenna.

On the other hand, in the case of uplink communication, when receiving a frame wirelessly from the mobile station 5, the Radio Equipment 3 performs data processing such as Digital/Analog (D/A) conversion on the frame received, and transmits the frame to the Radio Equipment Controller 2 through the CPRI.

The Radio Equipment Controller 2 delivers the frames to the upper-level device. Note that the Radio Equipment Controller 2 controls a time at which each frame is delivered by delaying the time depending on the Radio Equipment 3 from which the frame is conveyed and the antennas used therein. In short, as with the downlink communication, the Radio Equipment Controller 2 also performs a delay control process in the uplink communication.

Referring to FIG. 3, the Radio Equipment Controller 2 includes a control portion 21, a delay measurement portion 22, a downlink delay time calculation portion 23, a downlink delay correction portion 24, a CPRI transmission processing portion 25, a CPRI reception processing portion 26, an uplink delay time calculation portion 27, and an uplink delay correction portion 28.

Referring to FIG. 4, the Radio Equipment 3 includes a CPRI reception portion 31, a plurality of radio transmission processing portions 32, a plurality of antennas 33, a plurality of radio reception processing portions 34, a CPRI transmission portion 35, a delay measurement portion 36, and a delay time informing portion 37. One radio transmission processing portion 32, one antenna 33, and one radio reception processing portion 34 make one set. The number of sets of the radio transmission processing portion 32, the antenna 33, and the radio reception processing portion 34 is the same as the number of MIMO channels (the multiplexing order). Hereinafter, the radio transmission processing portion 32, the antenna 33, and the radio reception processing portion 34 of the k-th channel may be respectively referred to as a "radio transmission processing portion 32k", an "antenna 33k", and a "radio reception processing portion 34k".

The following is the details of processing performed by the individual portions of the Radio Equipment Controller 2 illustrated in FIG. 2, and the individual portions of the Radio Equipment 3 illustrated in FIG. 4.

[Basic Processing in Downlink Communication]

With the Radio Equipment Controller 2, data that has been transmitted from an upper-level device such as the RNC and is to be directed to the mobile station 5 undergoes baseband processing, and is transmitted to the Radio Equipment 3 by the CPRI transmission processing portion 25.

With the Radio Equipment 3, the CPRI reception portion 31 receives the data (frames) transmitted from the Radio Equipment Controller 2. The CPRI reception portion 31, then, distributes the frames to the individual radio transmission processing portions 32 (321, 322, and so on) in accordance with the number of antennas 33, i.e., the number of MIMO channels, provided in the subject Radio Equipment 3.

The radio transmission processing portion 32 performs data processing such as Digital/Analog (D/A) conversion on the frame distributed by the CPRI reception portion 31, and transmits the frame wirelessly to the mobile station 5 through the antenna 33 corresponding to the subject radio transmission processing portion 32.

Note that the downlink delay correction portion 24 of the Radio Equipment Controller 2, which will be described later, performs a correction (adjustment) process in such a manner to delay a time at which the CPRI transmission processing portion 25 delivers the frame. The process for correcting the time will be discussed later.

[Basic Processing in Uplink Communication]

With the Radio Equipment 3, the radio reception processing portion 34 receives a frame transmitted from the mobile station 5 through the antenna 33 corresponding to the subject radio reception processing portion 34. The radio reception processing portion 34, then, delivers the frame to the CPRI transmission portion 35.

The CPRI transmission portion 35 transmits (transfers), to the Radio Equipment Controller 2, the frame delivered by the radio reception processing portion 34.

With the Radio Equipment Controller 2, the CPRI reception processing portion 26 receives the frame transmitted from the Radio Equipment 3, and transfers the same to the upper-level device. Note that the uplink delay correction portion 28, which will be described later, performs a correction (adjustment) process in such a manner to delay a time at which the frame is transferred to the upper-level device. The process for correcting the time will be discussed later.

[Process for Correcting the Time]

Figure 7:
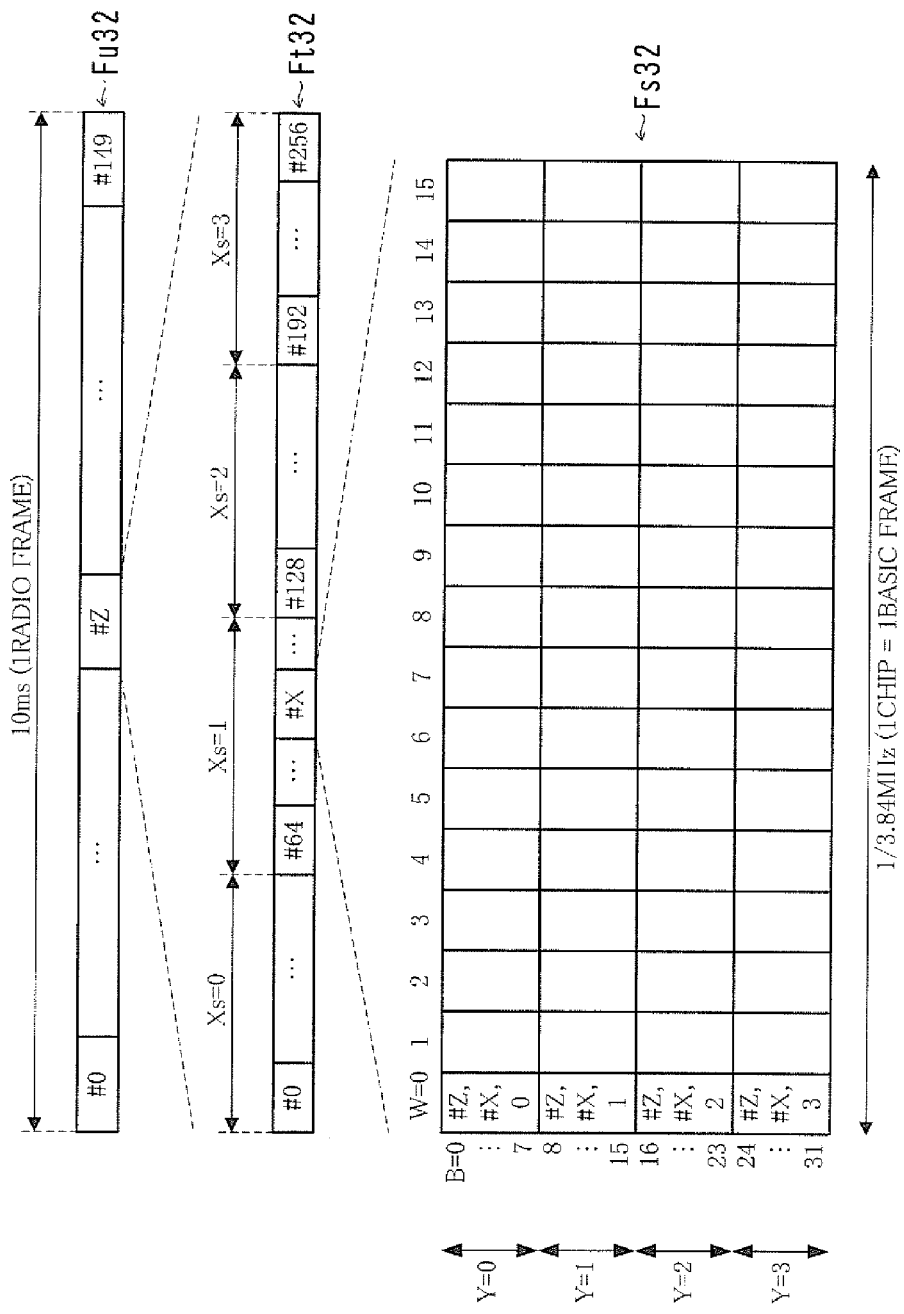
FIG. 7 is a diagram illustrating an example of a frame for 32-bit range.
Figure 8:
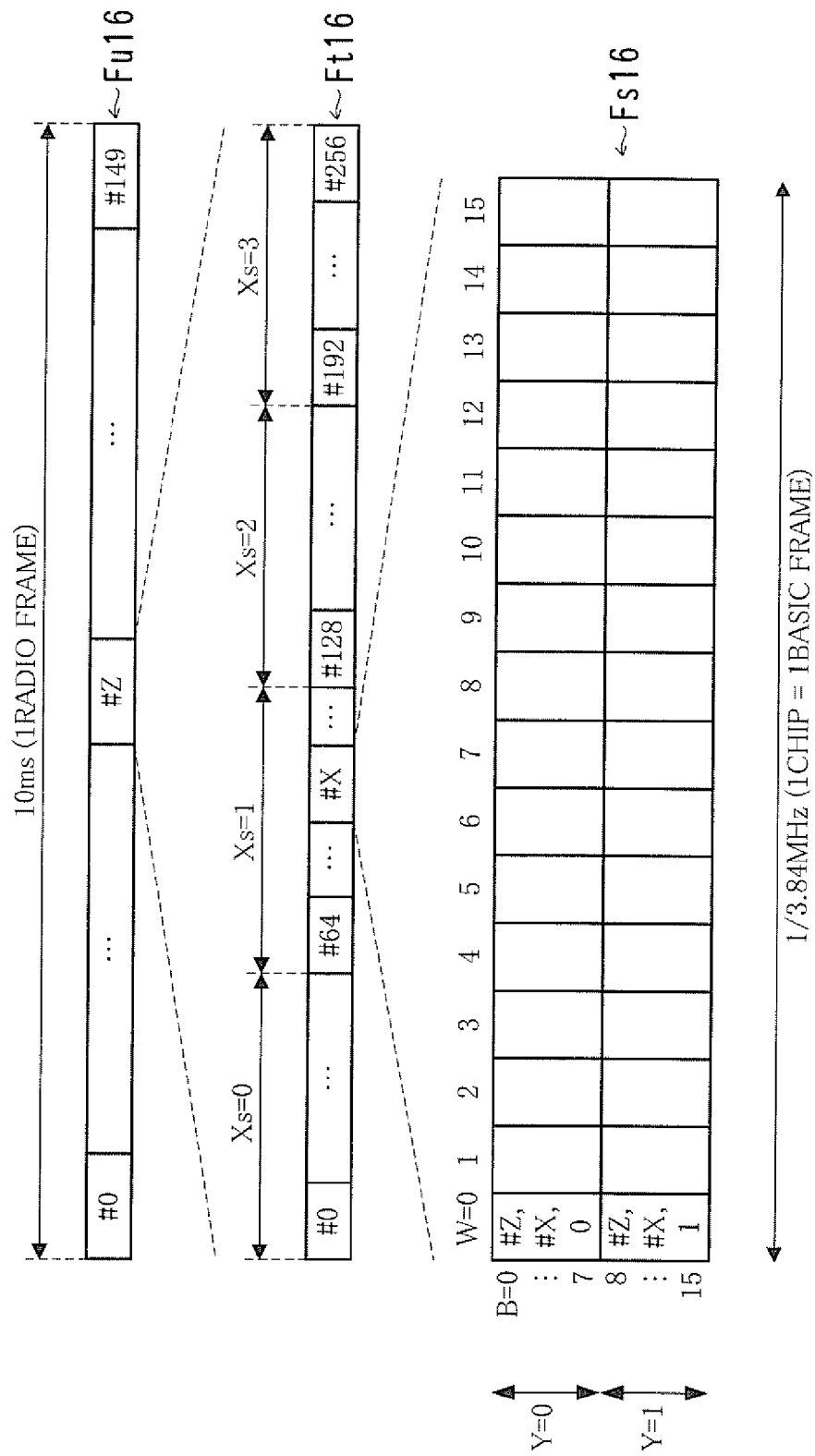
FIG. 8 is a diagram illustrating an example of a frame for 16-bit range.
Figure 9:
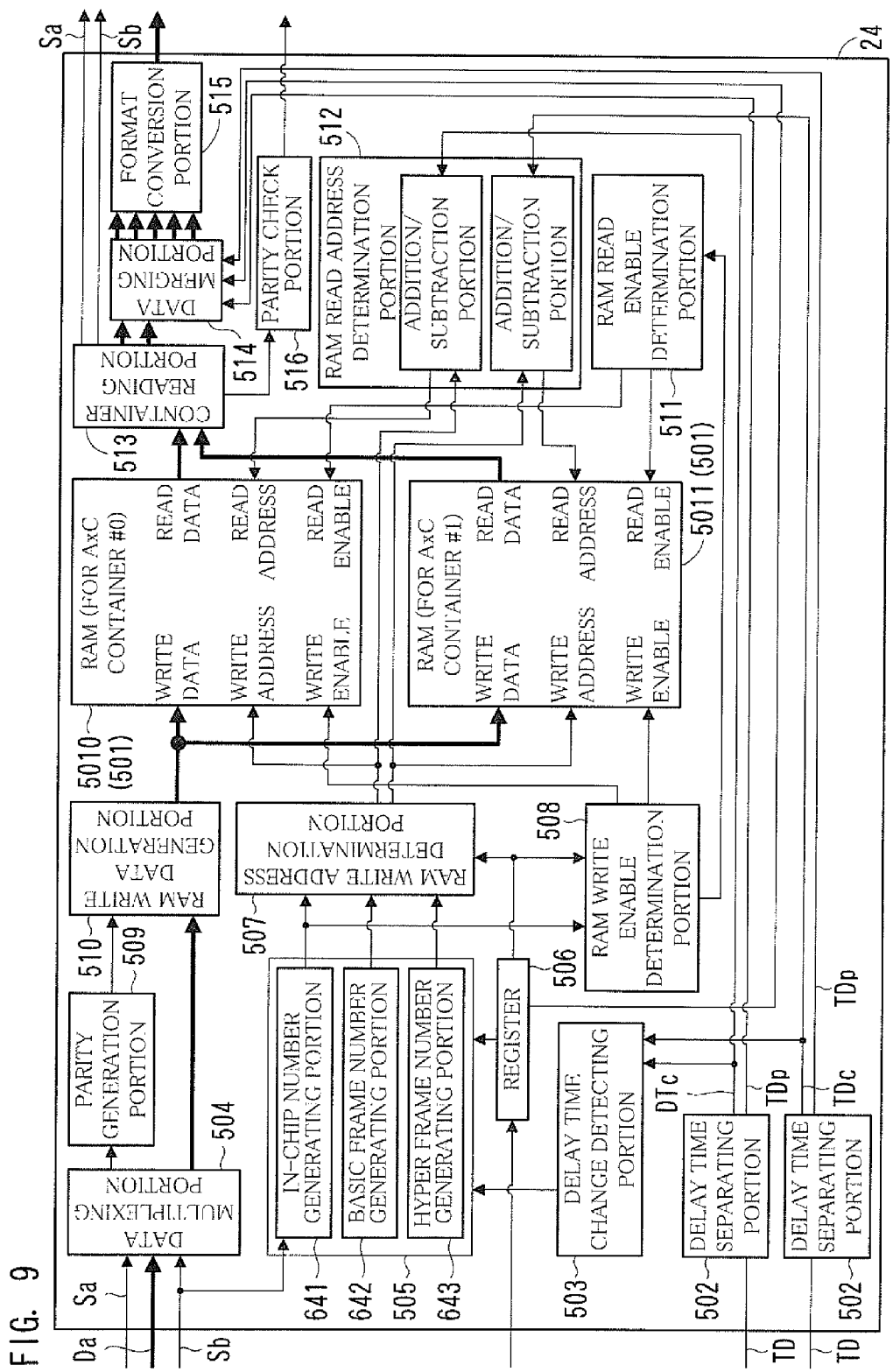
FIG. 9 is a diagram illustrating an example of the configuration of a downlink delay correction portion.
Figure 10:
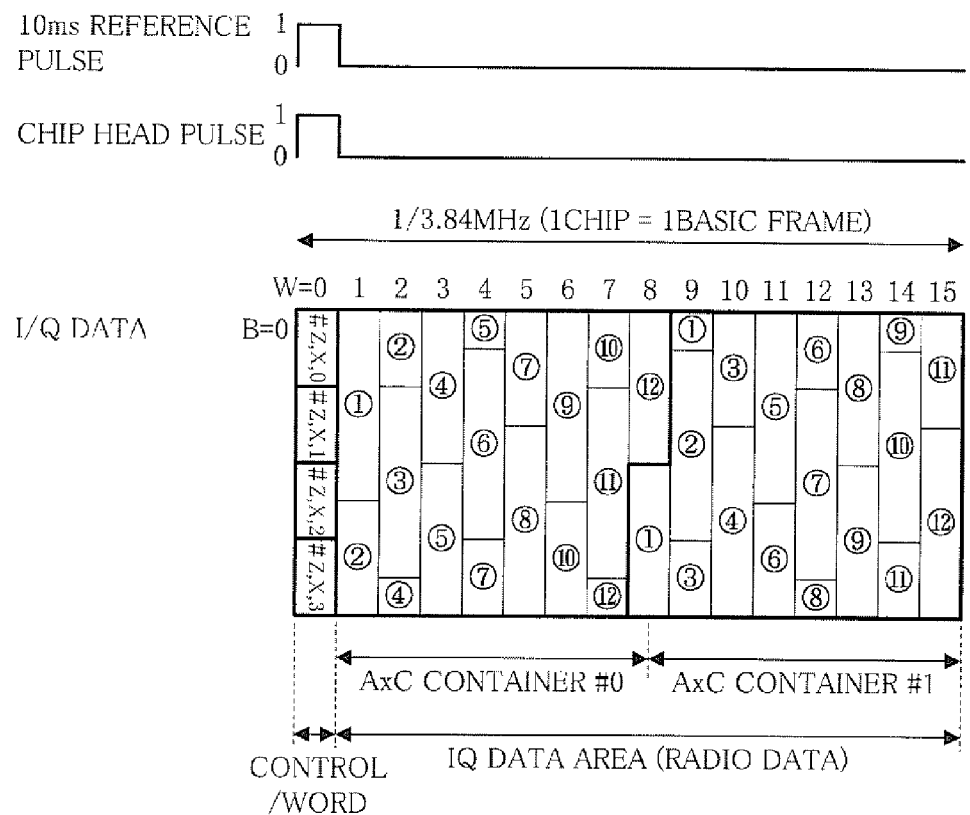
FIG. 10 is a diagram illustrating an example of a basic frame.
Figure 11:
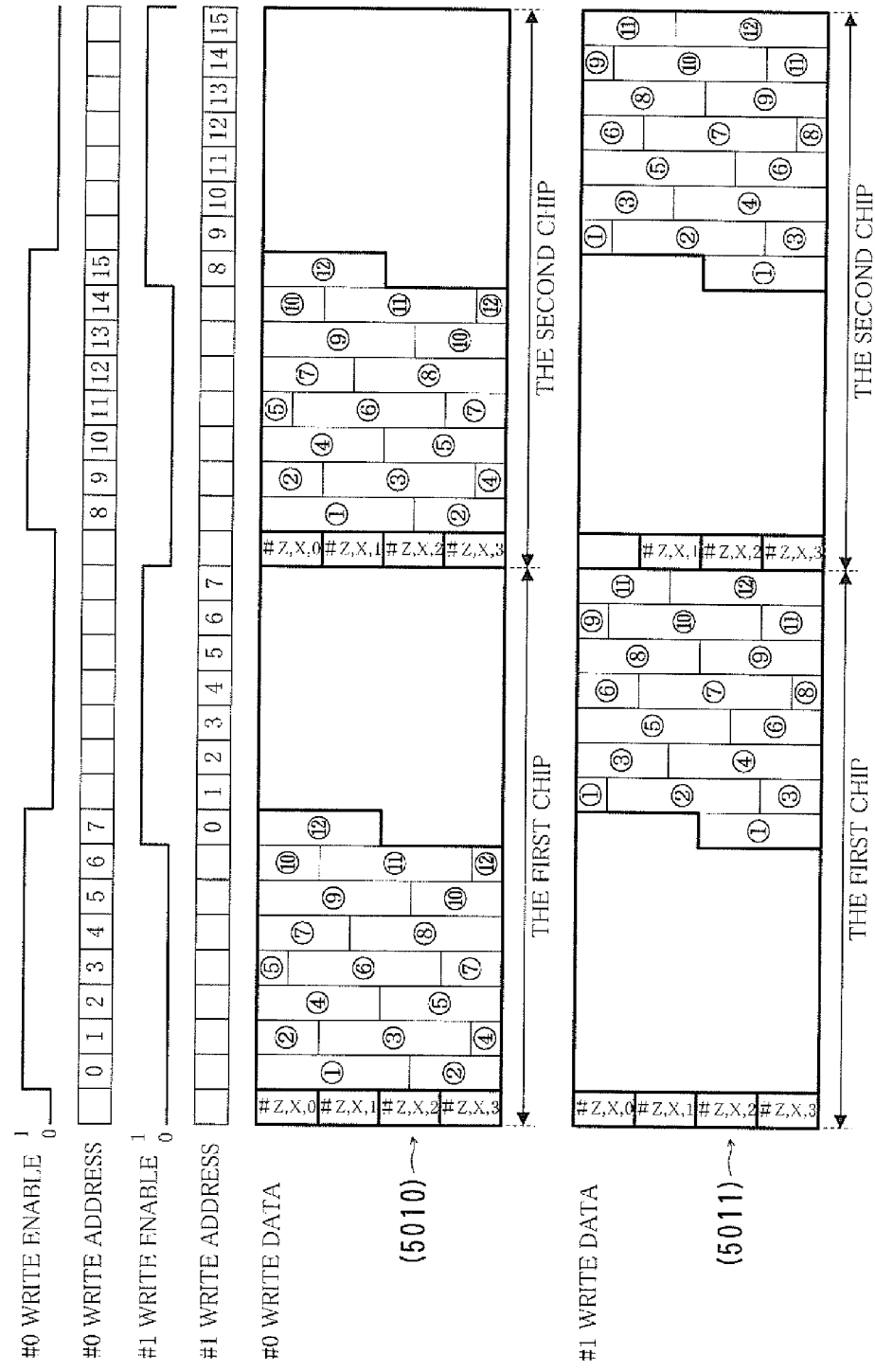
FIG. 11 is a diagram illustrating an example of a time at which data is written into a Random Access Memory (RAM)
Figure 12:
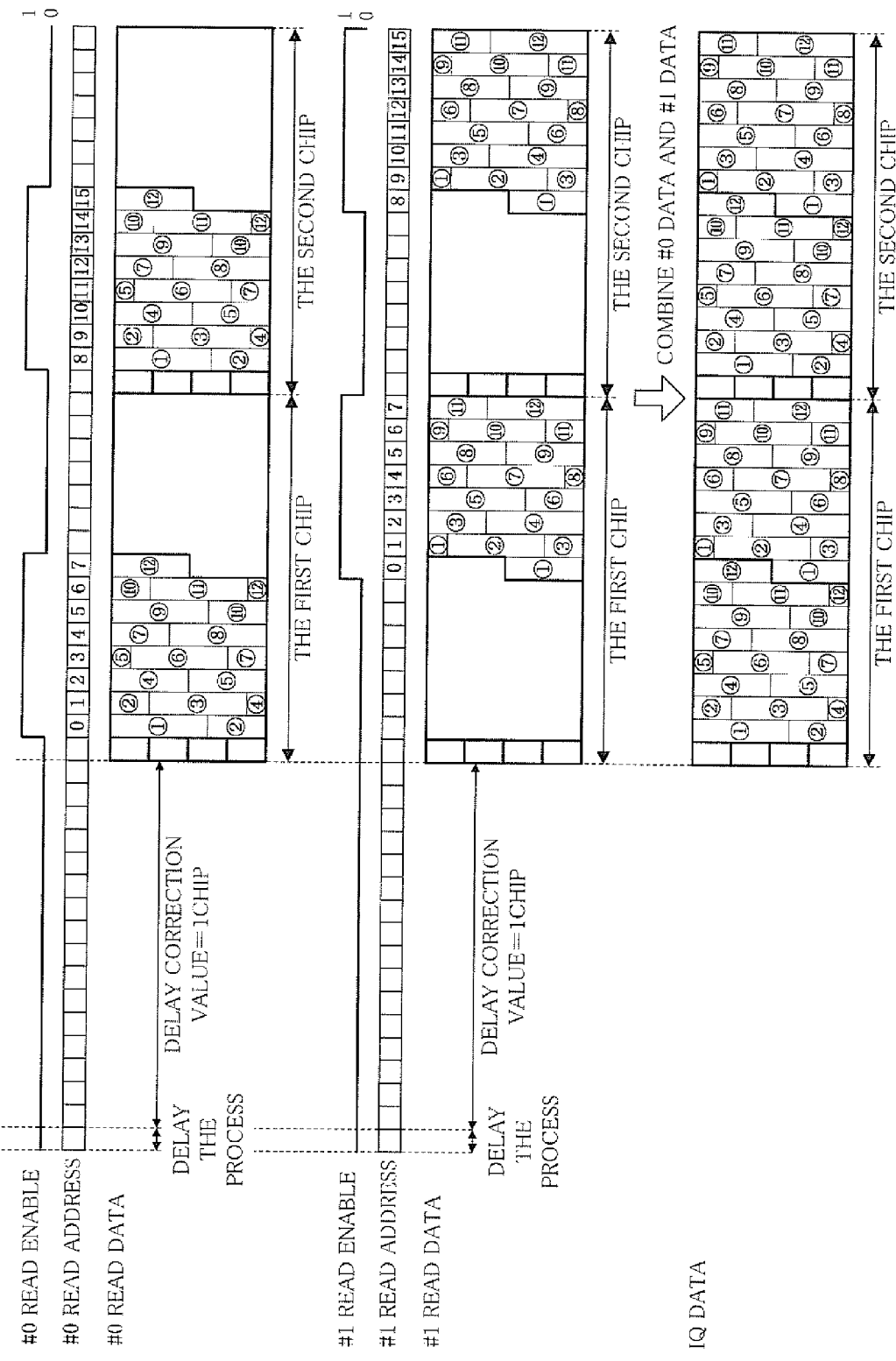
FIG. 12 is a diagram illustrating an example of a time at which data is read out from a RAM and the data is converted into a frame.
Figure 13:
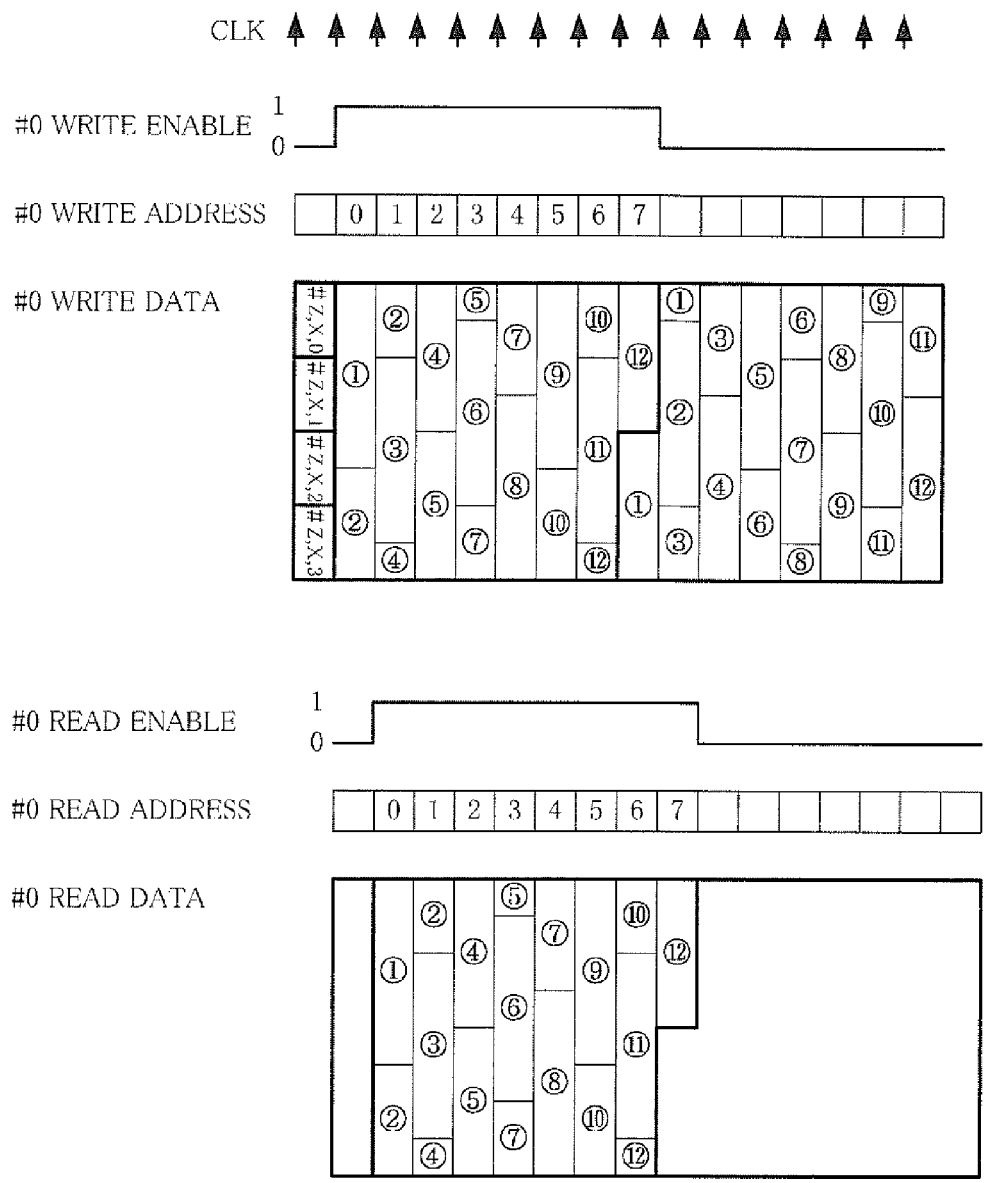
FIG. 13 is a diagram illustrating an example of a time at which data is read out for the case of a phase delay.
Figure 16:
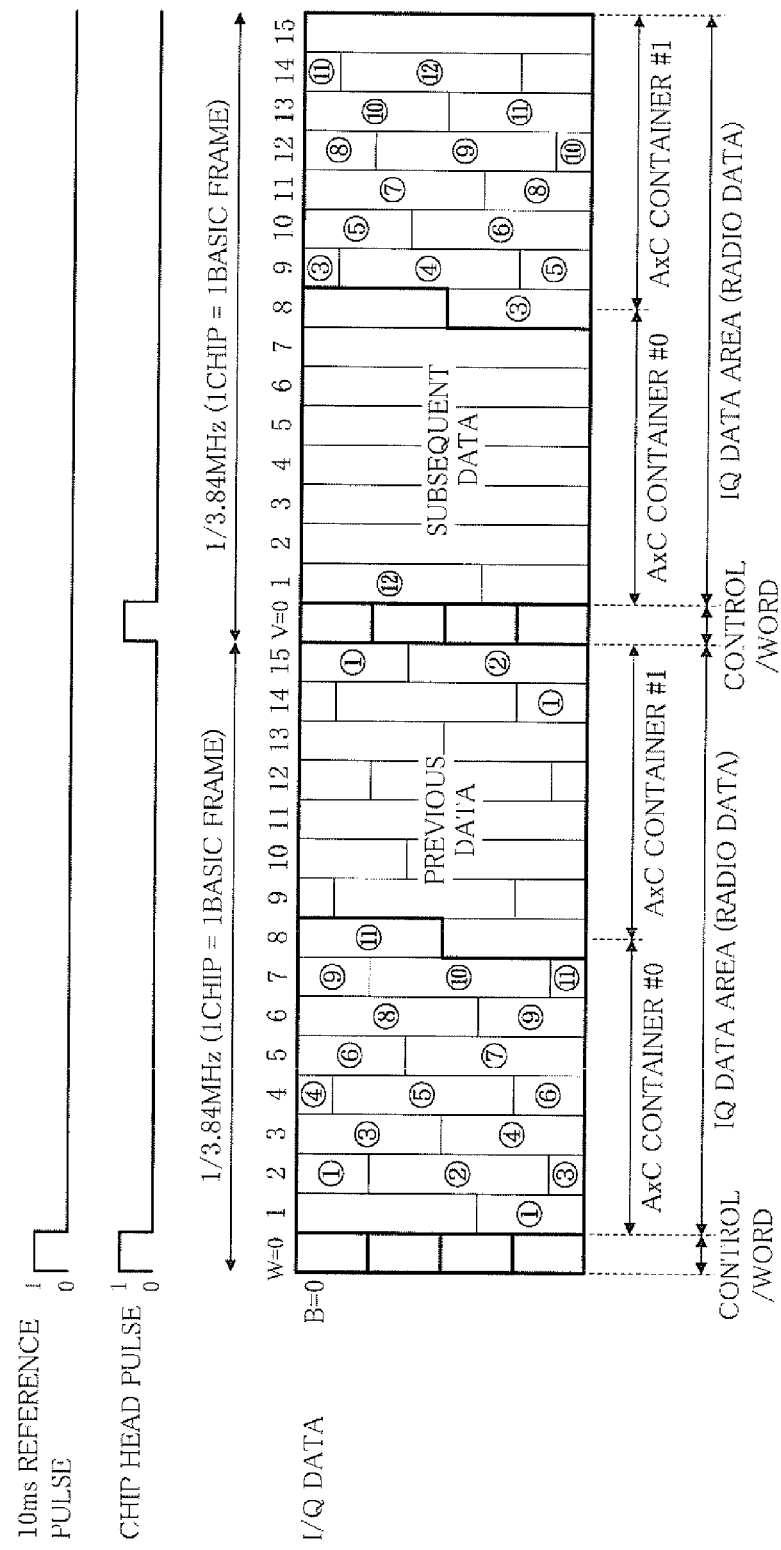
FIG. 16 is a diagram illustrating an example of conversion into a frame for the case of a phase delay.
Figure 17:
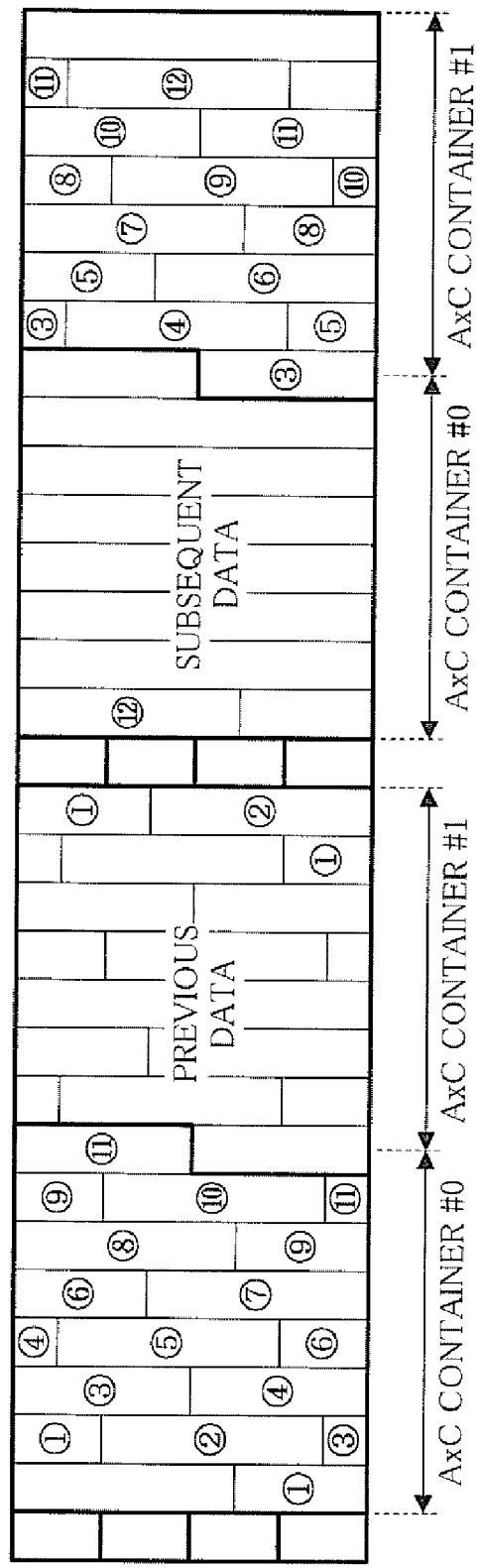
FIG. 17 is a diagram illustrating an example of frame format conversion.

FIG. 5 is a diagram illustrating an example of a control word for 32-bit range; FIG. 6 is a diagram illustrating an example of a control word for 16-bit range; FIG. 7 is a diagram illustrating an example of a frame for 32-bit range; FIG. 8 is a diagram illustrating an example of a frame for 16-bit range; FIG. 9 is a diagram illustrating an example of the configuration of the downlink delay correction portion 24; FIG. 10 is a diagram illustrating an example of a basic frame; FIG. 11 is a diagram illustrating an example of a time at which data is written into a Random Access Memory (RAM) 501; FIG. 12 is a diagram illustrating an example of a time at which data is read out from the RAM 51 and the data is converted into a frame; FIGS. 13 and 14 are diagrams illustrating an example of a time at which data is read out for the case of a phase delay; FIGS. 15A and 15B are diagrams illustrating an example of a latch; FIG. 16 is a diagram illustrating an example of conversion into a frame for the case of a phase delay; and FIG. 17 is a diagram illustrating an example of frame format conversion.

With the Radio Equipment Controller 2, the control portion 21 controls the individual portions thereof. In particular, in this embodiment, the control portion 21 performs control such that the time as mentioned above is corrected by giving, to the downlink delay correction portion 24 and the uplink delay correction portion 28, information relating to communication between the mobile station 5 and the Radio Equipment 3. Such information is, for example, information on speed, bandwidth, bit range, the amount of data, the number of A×C containers, and oversampling.

Each of the delay measurement portion 22 of the Radio Equipment Controller 2 and the delay measurement portion 36 of the Radio Equipment 3 measures an amount of time to be referred to when the time as mentioned above is corrected, in the following manner.

The delay measurement portion 22 measures the length of delay between the reference time and the time required for one frame to move between the Radio Equipment Controller 2 and the Radio Equipment 3, i.e., to move in the transmission path 4. Hereinafter, time corresponding to the delay is referred to as "REC-RE delay time TA".

As discussed earlier, the Base Transceiver Station 1 is provided with the plurality of pieces of Radio Equipment 3. The delay measurement portion 22, thus, calculates the REC-RE delay time TA between the Radio Equipment Controller 2 and each piece of Radio Equipment 3. In the case, for example, where the Base Transceiver Station 1 is provided with five pieces of Radio Equipment 3, the delay measurement portion 22 calculates five of REC-RE delay time TA.

The steps for calculating the REC-RE delay time TA are described, taking an example in which the REC-RE delay time TA between the Radio Equipment Controller 2 and the Radio Equipment 3 is calculated.

The delay measurement portion 22 instructs the CPRI transmission processing portion 25 to transmit a measurement frame Fa. In accordance with the instructions, the CPRI transmission processing portion 25 transmits the frame Fa to the Radio Equipment 3A. The delay measurement portion 22 starts measuring time concurrently with the transmission of the frame Fa by the CPRI transmission processing portion 25.

With the Radio Equipment 3A, as soon as the CPRI reception portion 31 receives the frame Fa, the CPRI transmission portion 35 transmits the frame Fa to the Radio Equipment Controller 2.

With the Radio Equipment Controller 2, when the CPRI reception processing portion 26 receives the frame Fa, the delay measurement portion 22 stops measuring the time. In this way, the time taken for the frame Fa to be transmitted from the Radio Equipment Controller 2 to the Radio Equipment 3A and sent back from the Radio Equipment 3A to the Radio Equipment Controller 2 is calculated. Hereinafter, the time calculated is referred to as "required time T14".

The delay measurement portion 22 subtracts the reference time T_offset_a from the required time T14. Thereby, the length of delay between the reference time T_offset_a and the required time T14 is obtained. The delay measurement portion 22, then, divides the value obtained by the subtraction by 2; thereby to obtain the REC-RE delay time TA.

An example of the frame Fa is a frame having the same size as that of a basic frame which will be mentioned later. This also applies to frames Fb and Fc described next.

On the other hand, the delay measurement portion 36 of the Radio Equipment 3 measures the length of delay between the reference time and the time required for a frame to pass through the subject Radio Equipment 3. Hereinafter, time corresponding to the delay in the downlink direction and time corresponding to the delay in the uplink direction are respectively referred to as "RE downlink delay time TB" and "RE uplink delay time TC".

As discussed earlier, the Radio Equipment 3 is compatible with the MIMO technology. The Radio Equipment 3 also has a plurality of sets of the radio transmission processing portion 32, the antenna 33, and the radio reception processing portion 34, and the number of sets is the same as the number of antennas 33. The delay measurement portion 36, thus, calculates the RE downlink delay time TB and the RE uplink delay time TC by an amount corresponding to the number of sets. In the case, for example, where the number of antennas 33 is four, the delay measurement portion 36 calculates four sets of the RE downlink delay time TB and the RE uplink delay time TC.

The steps for calculating the RE downlink delay time TB and the RE uplink delay time TC are described, taking an example in which the RE downlink delay time TB and the RE uplink delay time TC for the first channel in the Radio Equipment 3A are calculated.

With the Radio Equipment 3A, the delay measurement portion 36 conveys a measurement frame Fb to the CPRI reception portion 31, and starts measuring time. The CPRI reception portion 31 delivers the frame Fb to the radio transmission processing portion 321. The radio transmission processing portion 321, then, transmits the frame Fb wirelessly through the antenna 331. At a time when the frame Fb is transmitted, the delay measurement portion 36 stops measuring the time. In this way, the time taken for the frame Fb in the downlink direction to pass through the Radio Equipment 3A is determined. Hereinafter, the time determined is referred to as "required time T25". The delay measurement portion 36 subtracts the reference time T_offset_b from the required time T25. The difference calculated by the subtraction is the RE downlink delay time TB.

Further, the delay measurement portion 36 conveys a measurement frame Fc to the radio reception processing portion 341, and starts measuring time. The radio reception processing portion 341 delivers the frame Fc to the CPRI transmission portion 35. The CPRI transmission portion 35, then, transmits the frame Fc to the Radio Equipment Controller 2. At a time when the frame Fc is transmitted, the delay measurement portion 36 stops measuring the time. In this way, the time taken for the frame Fc in the uplink direction to pass through the Radio Equipment 3A is determined. Hereinafter, the time determined is referred to as "required time T53". The delay measurement portion 36 subtracts the reference time T_offset_c from the required time T53. The difference calculated by the subtraction is the RE uplink delay time TC.

The delay time informing portion 37 informs the Radio Equipment Controller 2 of the RE downlink delay time TB and the RE uplink delay time TC of each of the channels which are determined by the delay measurement portion 36.

The delay time informing portion 37 is configured to use a variety of methods to inform the Radio Equipment Controller 2 of the RE downlink delay time TB and the RE uplink delay time TC. For example, the delay time informing portion 37 writes the RE downlink delay time TB and the RE uplink delay time TC into a CPRI frame, and transmits the CPRI frame to the Radio Equipment Controller 2, so that the Radio Equipment Controller 2 is informed of the RE downlink delay time TB and the RE uplink delay time TC.

To be more specific, in the case of 32-bit range, the delay time informing portion 37 writes the RE downlink delay time TB and the RE uplink delay time TC in specific areas of vendor specific fields of the control word, which is illustrated in FIG. 5, contained in a basic frame Fs32. The delay time informing portion 37, then, transmits the basic frame Fs32 to the Radio Equipment Controller 2. Alternatively, in the case of 16-bit range, the delay time informing portion 37 writes the RE downlink delay time TB and the RE uplink delay time TC in specific areas of vendor specific fields of the control word, which is illustrated in FIG. 6, contained in a basic frame Fs16. The delay time informing portion 37, then, transmits the basic frame Fs16 to the Radio Equipment Controller 2.

As illustrated in FIG. 7, 256 basic frames Fs32 form one hyper frame Ft32. One hundred and fifty hyper frames Ft32 form one radio frame Fu32. Likewise, as illustrated in FIG. 8, 256 basic frames Fs16 form one hyper frame Ft16. One hundred and fifty hyper frames Ft16 form one radio frame Fu16. One radio frame is sent/received every 10 milliseconds. The basic frame is sometimes called a "Chip".

In the case where the radio transmission rate is 2457.6 Mb/s, the bit range is 32-bit range. Stated differently, in such a case, arithmetic processing and the like are carried out in 32 bits. In the case where the radio transmission rate is 1228.8 Mb/s, the bit range is 16-bit range.

With the Radio Equipment Controller 2, the RE downlink delay time TB and the RE uplink delay time TC of the individual channels, which are informed by the individual pieces of Radio Equipment 3, are respectively conveyed to the downlink delay time calculation portion 23 and the uplink delay time calculation portion 27. The REC-RE delay time TA measured by the delay measurement portion 22 is conveyed to both the downlink delay time calculation portion 23 and the uplink delay time calculation portion 27.

The downlink delay time calculation portion 23 calculates the amount of time necessary to delay the transmission of a frame to be relayed to the mobile station 5 based on each of the REC-RE delay time TA and each of the RE downlink delay time TB conveyed as described above. The time corresponding to the delay is hereinafter referred to as "downlink delay time TD".

As discussed earlier, the Radio Equipment Controller 2 is connected to a plurality of pieces of Radio Equipment 3 each piece of which has a plurality of channels. The downlink delay time calculation portion 23 calculates downlink delay time TD for each of the antennas 33 of the individual pieces of Radio Equipment 3. To be specific, the downlink delay time calculation portion 23 calculates the downlink delay time TD by adding, together, the REC-RE delay time TA of the Radio Equipment 3 and the RE downlink delay time TB of a channel. For example, the downlink delay time calculation portion 23 calculates the downlink delay time TD of the second channel of the Radio Equipment 3A by adding, together, the REC-RE delay time TA of the Radio Equipment 3A and the RE downlink delay time TB of the second channel of the Radio Equipment 3A.

The downlink delay correction portion 24 performs a correction process in such a manner to delay a time at which the CPRI transmission processing portion 25 delivers a frame to the Radio Equipment 3. To be specific, the downlink delay correction portion 24 delays the time, with respect to the reference time, by an amount corresponding to the downlink delay time TD calculated by the downlink delay time calculation portion 23, and delivers the frame to the Radio Equipment 3.

For example, the downlink delay correction portion 24 delivers, to the CPRI transmission processing portion 25, a frame to be transmitted through the second channel of the Radio Equipment 3A after delaying the transmission of the frame by an amount corresponding to the downlink delay time TD of the second channel of the Radio Equipment 3A.

The following is a description of an example of the configuration for delaying a time at which a frame is delivered, with reference to FIG. 9.

Referring to FIG. 9, the downlink delay correction portion 24 is configured of a RAM 501, a delay time separating portion 502, a delay time change detecting portion 503, a data multiplexing portion 504, a count portion 505, a register 506, a RAM write address determination portion 507, a RAM write enable determination portion 508, a parity generation portion 509, a RAM write data generation portion 510, a RAM read enable determination portion 511, a RAM read address determination portion 512, a container reading portion 513, a data merging portion 514, a format conversion portion 515, a parity check portion 516, and the like. The delay time separating portion 502 through the format conversion portion 515 are implemented by electronic circuits. Another configuration is possible in which a part or the whole of the processing steps is described in the form of a program, and a Central Processing Unit (CPU) executes the program to implement the delay time separating portion 502 through the format conversion portion 515.

Each piece of Radio Equipment 3 includes a plurality of RAMs 501. The number of RAMs 501 is the same as the number of A×C containers implementable in the Radio Equipment 3.

Herein, "the number of A×C containers" represents "the number of antennas 33×carriers". Suppose, for example, that the number of antennas 33 of the Radio Equipment 3A is four, and three carriers or less can be used concurrently per antenna 33. In such a case, twelve RAMs 501 are provided in the Radio Equipment 3A. Further, one carrier can carry signals to be directed to a plurality of users (mobile stations 5). A "container" is data to be transmitted to or received from a mobile station 5, and has a size smaller than that of a basic frame. The container is also divided into twelve data groups. The term "A×C container" means a container transmitted to or received from a mobile station 5 through the C-th carrier of the A-th antenna 33. For purposes of simplicity, FIG. 9 illustrates only two of the RAMs 501.

Among the containers (data) to be transmitted through the mobile station 5, a container to be transmitted through the antenna 33 and the carrier corresponding to the RAM 501 is written into the subject RAM 501. The container written into the RAM 501 is read out therefrom at a time described later, and is transmitted to the Radio Equipment 3.

As with the RAM 501, the number of delay time separating portions 502 is the same as the number of A×C containers of each piece of Radio Equipment 3. Accordingly, a delay time separating portion 502 corresponds to any one of the antennas 33 of any one piece of Radio Equipment 3.

The downlink delay time calculation portion 23 conveys, to the delay time separating portion 502, the downlink delay time TD of the antenna 33 of the Radio Equipment 3 corresponding to the subject delay time separating portion 502. The delay time separating portion 502 divides the received downlink delay time TD into time in one chip and time shorter than the time in one chip. The former is hereinafter referred to as "chip delay time TDc", while the latter is referred to as "phase delay time TDp". As discussed above, one chip (basic frame) is transmitted through the antenna 33 of the Radio Equipment 3 every (1/3.84 MHz)/s, which is hereinafter referred to as "one chip time". Thus, the quotient obtained by dividing the downlink delay time TD by the one chip time is the chip delay time TDc, and the remainder thereof is the phase delay time TDp.

The delay time separating portion 502, then, conveys the chip delay time TDc obtained to the delay time change detecting portion 503 and an addition/subtraction portion 651 (described later) corresponding to the RAM 501 for the subject delay time separating portion 502. The delay time separating portion 502, then, conveys the phase delay time TDp obtained to the format conversion portion 515 described later.

The delay time change detecting portion 503 detects change in the downlink delay time TD during the time in one chip, and informs the count portion 505 (described later) of the detection result.

A reference pulse signal Sa, In-phase/Quadrature-phase (I/Q) data Da, and a chip head pulse signal Sb are inputted to the data multiplexing portion 504.

The reference pulse signal Sa is a pulse signal indicating the head of a radio frame. In this example, a pulse signal that is turned ON every 10 milliseconds is inputted as the reference pulse signal Sa. The chip head pulse signal Sb is a pulse signal indicating the head of a basic frame. In this example, a pulse signal that is turned ON every one chip time is inputted as the chip head pulse signal Sb. Note, however, that the reference pulse signal Sa is turned ON at any one of times at which the chip head pulse signal Sb is turned ON. To be specific, the reference pulse signal Sa is turned ON once in every 38,400 times.

The I/Q data Da is data to be sent to a mobile station 5 wirelessly, i.e., target data. The I/Q data Da is divided into a plurality of basic frames (chips), and the resultant is delivered to the parity generation portion 509 and the RAM write data generation portion 510, which will be described later.

The count portion 505 includes an in-chip number generating portion 641, a basic frame number generating portion 642, and a hyper frame number generating portion 643. The count portion 505 is operable to generate the individual frame numbers.

Every time the chip head pulse signal Sb is turned ON, the in-chip number generating portion 641 generates a number for each unit of bit range data of a basic frame (chip). The number generated is hereinafter referred to as a "unit number". In the case, for example, where one basic frame is dividable into 16 pieces of data, the in-chip number generating portion 641 generates unit numbers of 0 through 15. The in-chip number generating portion 641, then, delivers the generated unit numbers, in increasing order of the unit number, to the RAM write address determination portion 507 and the RAM write enable determination portion 508 every 1/16 chip time.

The basic frame number generating portion 642 generates a basic frame number that is a sequential number to be added to a basic frame.

To be specific, the basic frame number generating portion 642 includes a first counter. The initial value of the first counter is "zero". Every time both the reference pulse signal Sa and the chip head pulse signal Sb are turned ON, the basic frame number generating portion 642 sets the value of the first counter at zero, and delivers the value "zero" as the basic frame number to the RAM write address determination portion 507. On the other hand, every time only the chip head pulse signal Sb is turned ON, the basic frame number generating portion 642 adds the value "1" to the first counter, and delivers to the RAM write address determination portion 507, as the basic frame number, the value indicated by the first counter to which the value "1" has been added.

The hyper frame number generating portion 643 generates a radio frame number that is a sequential number to be added to a radio frame.

To be specific, the hyper frame number generating portion 643 includes a second counter. The initial value of the second counter is "zero". Every time the reference pulse signal Sa is turned ON, the hyper frame number generating portion 643 adds the value "1" to the second counter, and delivers to the RAM write address determination portion 507, as the radio frame number, the value indicated by the second counter to which the value "1" has been added.

The register 506 stores, therein, information on communication between the mobile station 5 and the Radio Equipment 3. Such information is, for example, information on a band and the number of A×C containers, and is sent by the control portion 21.

The RAM write address determination portion 507 determines an address indicating a storage location of a container in the RAM 501. The container is generated by the RAM write data generation portion 510 which will be described later. Such a determination is made based on the information stored in the register 506, and the unit number, the basic frame number, and the radio frame number that are sent from the count portion 505. Hereinafter, the determined address is refereed to as a "write address". The RAM write address determination portion 507 writes the write address thus determined in a predetermined area of the RAM 501 storing the subject container therein. Such a predetermined area is hereinafter referred to as a "write address area". The RAM write address determination portion 507, further, conveys the determined write address to the addition/subtraction portion 651 (described later) corresponding to the subject RAM 501.

The RAM write enable determination portion 508 determines a RAM 501 into which data can be written. Such a determination is made based on the information stored in the register 506 and the unit number inputted from the in-chip number generating portion 641.

The RAM write enable determination portion 508, then, writes, into a predetermined area of the RAM 501 for which the determination that data can be written has been made, the value "1" representing that data can be written. Such a predetermined area is hereinafter called a "write enable area". The RAM write enable determination portion 508 also writes, into write enable areas of the other RAMs 501, the value "zero" representing that data cannot be written. Thereafter, the RAM write enable determination portion 508 conveys, to the RAM read enable determination portion 511 described later, an identifier of the RAM 501 for which the determination that data can be written has been made.

The parity generation portion 509 generates a parity code that is a code for error detection for each piece of data having a predetermined size and sent from the data multiplexing portion 504. The parity generation portion 509, then, sends the generated parity code to the RAM write data generation portion 510.

The RAM write data generation portion 510 adds the parity code generated by the parity generation portion 509 to the data sent from the data multiplexing portion 504. The RAM write data generation portion 510 generates a container to be written into the RAM 501 by, for example, dividing data having the parity code depending on the number of channels (antennas) of the Radio Equipment 3 that is a relay destination. The RAM write data generation portion 510, then, writes the generated container into the RAM 501 for which the RAM write enable determination portion 508 has determined that data can be written thereinto, i.e., the RAM 501 having the value "1" in the write enable area. To be more specific, the RAM write data generation portion 510 writes the generated container into the area corresponding to the write address determined by the RAM write address determination portion 507.

In this way, frames of the A×C containers corresponding to the individual RAMs 501 are written thereinto.

Referring to FIG. 10, for example, suppose that two basic frames are inputted, and each of the basic frames includes a container to be transmitted through the first carrier of the first antenna 33 (antenna 331) of the Radio Equipment 3A and a container to be transmitted through the second carrier thereof. In such a case, the individual containers are written into the RAMs 501 corresponding thereto as illustrated in FIG. 11. Hereinafter, the RAM 501 corresponding to the former container is sometimes called a "RAM 5010" and the RAM 501 corresponding to the latter container is sometimes called a "RAM 5011". Further, a container stored in the RAM 5010 is sometimes referred to as a "container #0" and a container stored in the RAM 5011 is sometimes referred to as a "container #1".

The RAM read enable determination portion 511 writes the value "1" representing that data can be read out into a predetermined area of the RAM 501 whose identifier has been conveyed by the RAM write enable determination portion 508. Such a predetermined area is hereinafter called a "read enable area". The RAM read enable determination portion 511 also writes the value "zero" representing that data cannot be read out into read enable areas of the other RAMs 501.

The RAM read address determination portion 512 determines an address of the head of data to be read out next from each of the RAMs 501 (5030, 5031, and so on). The address is hereinafter referred to as a "read address".

To be specific, the RAM read address determination portion 512 is provided with a plurality of addition/subtraction portions 651 (6510, 6511, and so on). The addition/subtraction portions 651 correspond to the RAMs 501 (5030, 5031, and so on).

The addition/subtraction portion 651 determines, as the read address, an address obtained by subtracting an amount of the address corresponding to the chip delay time TDc informed by the delay time separating portion 502 from the write address informed by the RAM write address determination portion 507. The "amount of the address corresponding to the chip delay time TDc" herein means the size of an area required to store data that can be sent/received during the chip delay time TDc.

In short, the addition/subtraction portion 651 determines, as the read address, an address obtained by subtracting an amount of the address corresponding to the chip delay time TDc from the write address. The addition/subtraction portion 651, then, writes the determined read address into a predetermined area of the RAM 501 corresponding to the subject addition/subtraction portion 651. Such a predetermined area is hereinafter referred to as a "read address area".

The container reading portion 513 searches for a RAM 501 having the value "1" in the read enable area, reads out data (container) from an address area indicated in the read address area of the RAM 501 found out by the search, and delivers the data to the data merging portion 514. The container reading portion 513 also outputs the reference pulse signal Sa and the chip head pulse signal Sb.

The data merging portion 514 temporarily holds (latches) the containers read out from the individual RAMs 501 by the container reading portion 513. The data merging portion 514, then, combines the containers together sequentially, and generates basic frames. At this time, the transmission of containers is appropriately delayed by a time shorter than one chip time based on the phase delay time TDp conveyed by the individual delay time separating portions 502.

The following is a description of steps for reading out containers and merging the containers with one another by the container reading portion 513 and the data merging portion 514, with reference to FIG. 12 through FIG. 16.

In the case where the chip delay time TDc corresponding to each of the RAM 5010 and the RAM 5011 is one chip time, and the phase delay time TDp corresponding to each of the RAM 5010 and the RAM 5011 is zero chip time, a process for reading out containers and merging the containers with one another is carried out as illustrated in FIG. 12.

The value "1" is indicated alternately in the read enable area of the RAM 5010 and the read enable area of the RAM 5011. To be specific, when the value "1" is indicated in the read enable area of the RAM 5010, the value "zero" is indicated in the read enable area of the RAM 5011. When the value "zero" is indicated in the read enable area of the RAM 5010, the value "1" is indicated in the read enable area of the RAM 5011.

In the case where a shift in values in the read enable area of the RAM 5010 demonstrates "1", "zero", "1", and "zero", and a shift in values in the read enable area of the RAM 5011 demonstrates "zero", "1", "zero", and "1", the container reading portion 513 reads out containers in the following order: the container #0, the container #1, the container #0, and the container #1.

The data merging portion 514 merges the container #0 read out first with the container #1 read out second; thereby generates the first chip. The data merging portion 514, then, merges the container #0 read out third with the container #1 read out fourth; thereby generates the second chip.

On the other hand, in the case where the chip delay time TDc corresponding to each of the RAM 5010 and the RAM 5011 is zero chip time, the phase delay time TDp corresponding to the RAM 5010 is $^{1}\!/_{16}$ chip time, and the phase delay time TDp corresponding to the RAM 5011 is $^{10}\!/_{16}$ chip time, a process for reading out containers and merging the containers with one another is carried out as illustrated in FIG. 13 through FIG. 16.

The change in values in the respective read enable areas of the RAM 5010 and the RAM 5031 does not depend on the phase delay time TDp. Accordingly, irrespective of the phase delay time TDp, the container reading portion 513 reads out containers from the RAM 5010 and the RAM 5031 respectively as illustrated in FIG. 13 and FIG. 14 based on the values of the read enable areas.

The data merging portion 514 latches the container #0 read out from the RAM 5010 for $^{1}\!/_{16}$ chip time as illustrated in FIG. 15A, and latches the container #1 read out from the RAM 5011 for $^{12}\!/_{16}$ chip time as illustrated in FIG. 15B. The data merging portion 514, then, merges the containers with each other to generate a basic frame as illustrated in FIG. 16.

The data merging portion 514 delivers the basic frame thus generated to the format conversion portion 515.

Referring back to FIG. 9, the format conversion portion 515 performs a process for converting a format of the basic frame generated by the data merging portion 514 into another format. The format conversion portion 515 delivers the basic frame that has been subjected to the conversion process (see FIG. 17) to the CPRI transmission processing portion 25 (see FIG. 3).

The parity check portion 516 checks whether or not an error occurs in the basic frame generated by the data merging portion 514 by using a parity code contained in the basic frame.

Referring back to FIG. 3, the uplink delay time calculation portion 27 calculates the amount of time necessary to delay the transmission of a frame to be relayed to an upper-level device based on each of the REC-RE delay time TA and each of the RE uplink delay time TC conveyed as described above. The time corresponding to the delay is hereinafter referred to as "uplink delay time TU".

As discussed earlier, the Radio Equipment Controller 2 is connected to a plurality of pieces of Radio Equipment 3 each piece of which has a plurality of channels. The uplink delay time calculation portion 27 calculates uplink delay time TU for each of the antennas 33 of the individual pieces of Radio Equipment 3. To be specific, the uplink delay time calculation portion 27 calculates the uplink delay time TU by adding, together, the REC-RE delay time TA of the Radio Equipment 3 and the RE uplink delay time TC of a channel. For example, the uplink delay time calculation portion 27 calculates the uplink delay time TU of the second channel of the Radio Equipment 3A by adding, together, the REC-RE delay time TA of the Radio Equipment 3A and the RE uplink delay time TC of the second channel of the Radio Equipment 3A.

The uplink delay correction portion 28 performs an adjustment process in such a manner to delay a time at which a frame received by the CPRI reception processing portion 26 is delivered to the upper-level device. To be specific, the uplink delay correction portion 28 delays the time, with respect to the reference time, by an amount corresponding to the uplink delay time TU calculated by the uplink delay time calculation portion 27, and delivers the frame to the Radio Equipment 3.

A method for performing the process for delaying the frame delivery by the uplink delay time TU is the same as the method for performing the process for delaying the frame delivery by the downlink delay time TD by the downlink delay correction portion 24. To be specific, the uplink delay correction portion 28 delays the delivery of the target data that is inputted from the CPRI reception processing portion 26 and is to be transferred to the upper-level device by using the uplink delay time TU rather than the downlink delay time TD, and outputs the target data to the upper-level device.

Figure 18:
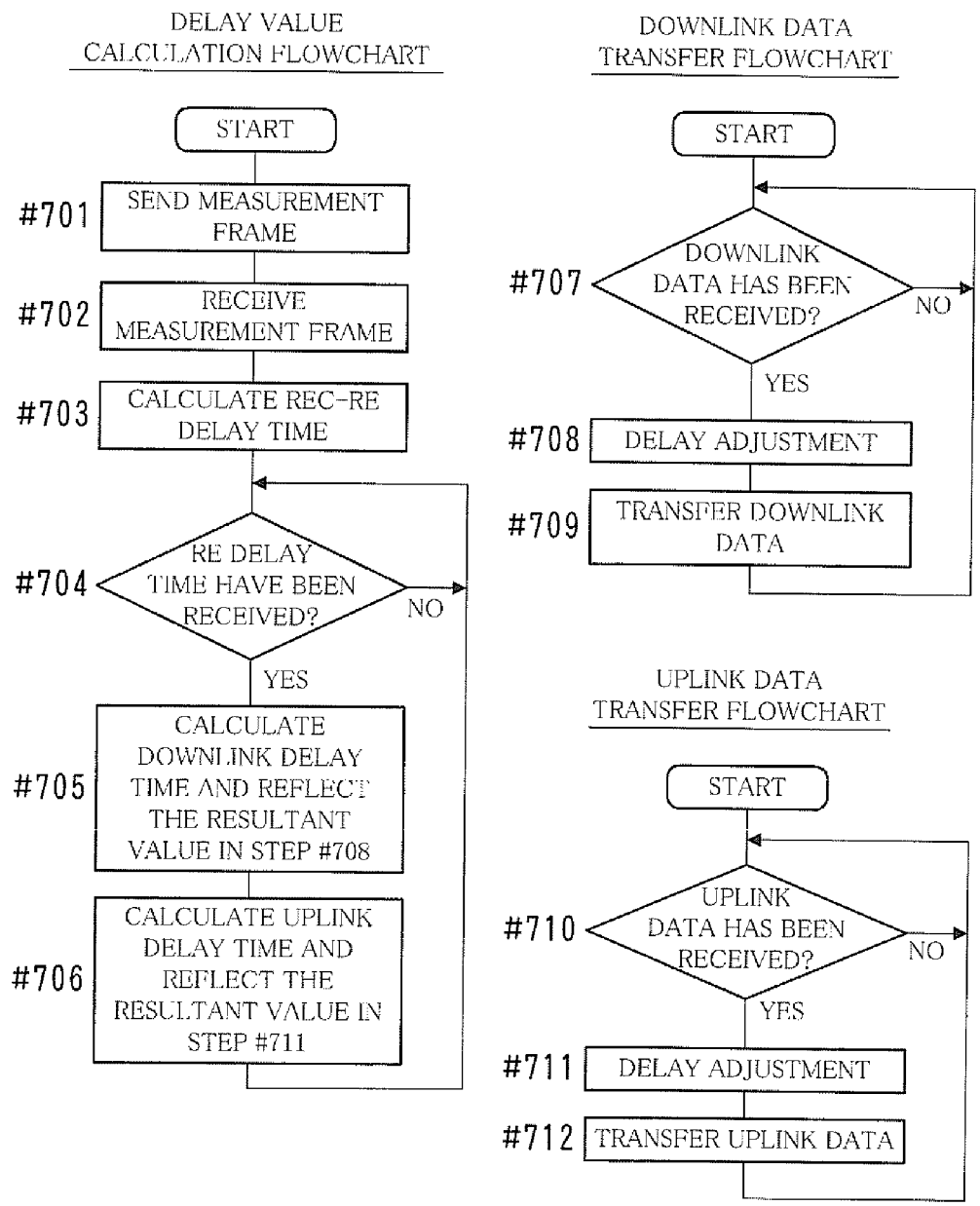
FIG. 18 is a flowchart illustrating an example of the overall processing flow of a Radio Equipment Controller.
Figure 19:
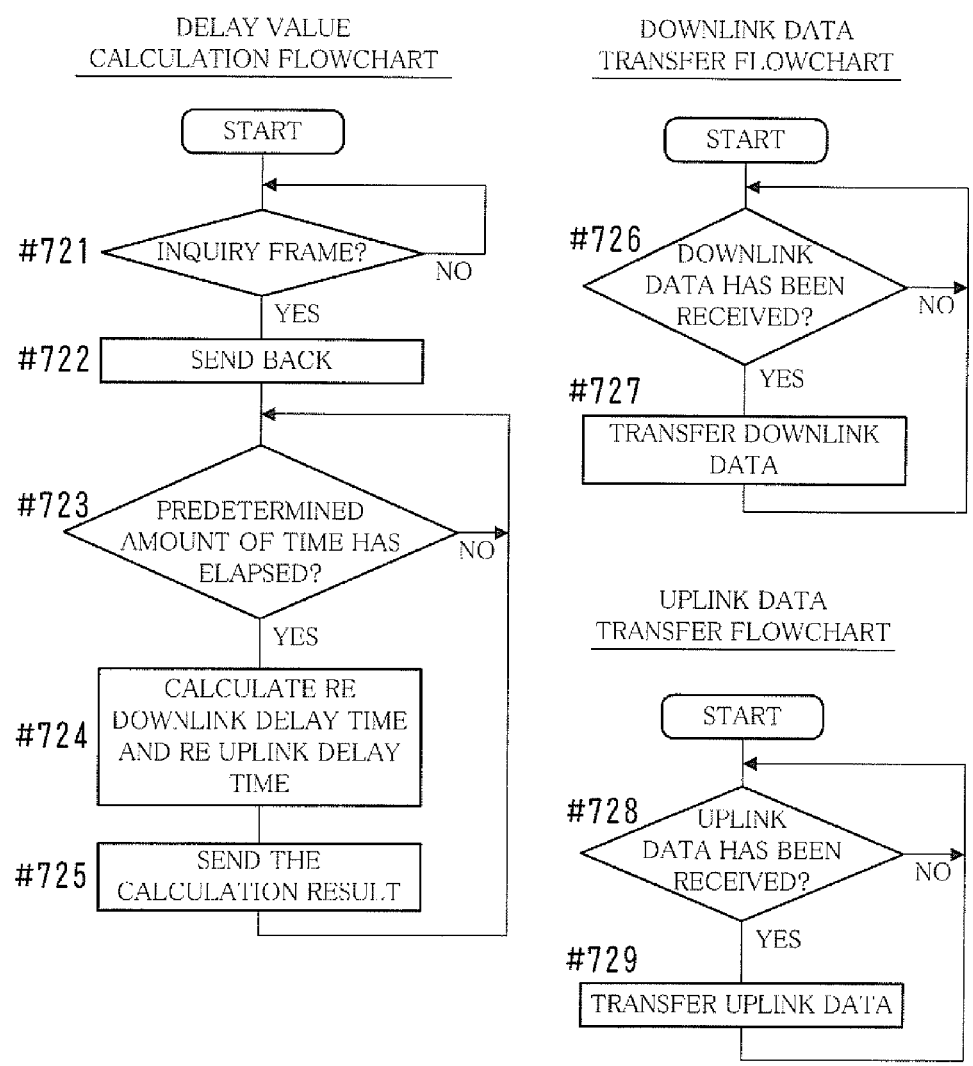
FIG. 19 is a diagram illustrating an example of the overall processing flow of Radio Equipment.

FIG. 18 is a flowchart illustrating an example of the overall processing flow of the Radio Equipment Controller 2; and FIG. 19 is a diagram illustrating an example of the overall processing flow of the Radio Equipment 3.

A description is provided below of the overall processing flow of the Radio Equipment Controller 2 and the Radio Equipment 3, with reference to FIG. 18 and FIG. 19.

The Radio Equipment Controller 2 transmits a measurement frame (frame Fa) to each piece of Radio Equipment 3 for the purpose of measuring a delay, with respect to the reference time, of the time required for the communication between the Radio Equipment Controller 2 and the Radio Equipment 3 (#701 of FIG. 18).

Upon receiving the frame Fa (Yes in #721 of FIG. 19), each piece of Radio Equipment 3 transmits the frame Fa back to the Radio Equipment Controller 2 (#722).

When the frame Fa is sent back from certain Radio Equipment 3 (#702 of FIG. 18), the Radio Equipment Controller 2 measures REC-RE delay time TA between the Radio Equipment 3 and the Radio Equipment Controller 2 based on a period of time from when the frame Fa is transmitted to the Radio Equipment 3 to when the frame Fa is sent back from the Radio Equipment 3 (#703).

Every time a predetermined time comes, e.g., a predetermined amount of time elapses (Yes in #723 of FIG. 19), the Radio Equipment 3 measures, with respect to the reference time, a delay of the time required to transmit the frame sent from the Radio Equipment Controller 2 to the mobile station 5, i.e., measures the RE downlink delay time TB, and, also measures, with respect to the reference time, a delay of the time required to transmit the frame sent from the mobile station 5 to the Radio Equipment Controller 2, i.e., measures the RE uplink delay time TC (#724). The Radio Equipment 3 informs the Radio Equipment Controller 2 of the measurement result (#725). Note that the Radio Equipment 3 measures the RE downlink delay time TB and the RE uplink delay time TC for each combination of the radio transmission processing portion 32, the antenna 33, and the radio reception processing portion 34 of the subject Radio Equipment 3.

Upon receiving the RE downlink delay time TB and the RE uplink delay time TC from the Radio Equipment 3 (Yes in #704 of FIG. 18), the Radio Equipment Controller 2 uses, in addition thereto, the REC-RE delay time TA of the Radio Equipment 3 to calculate the downlink delay time TD and the uplink delay time TU, and uses the calculated downlink delay time TD and uplink delay time TU as parameters for delay control in Step #708 and Step #711 described below (#705 and #706). As discussed above, the downlink delay time TD is time necessary to delay the transmission of a frame to be relayed to the mobile station 5. The uplink delay time TU is time necessary to delay the transmission of a frame to be relayed to an upper-level device.

In this way, the downlink delay time TD and the uplink delay time TU are determined for each antenna 33 of each piece of Radio Equipment 3.

When receiving, from the upper-level device, the data to be sent to the mobile station 5 (Yes in #707 of FIG. 18), the Radio Equipment Controller 2 converts the data into a frame, and transfers the frame to the Radio Equipment 3 for relaying the data (frame) (#709). At this time, the Radio Equipment Controller 2 delays a time at which the data is transferred based on the downlink delay time TD relating to the Radio Equipment 3 for relaying the data and the antenna 33 thereof (#708).

When receiving the frame transferred from the Radio Equipment Controller 2 (Yes in #726 of FIG. 19), the Radio Equipment 3 transmits wirelessly the frame to the mobile station 5 as the destination (#727).

When receiving the data from the mobile station 5 (Yes in #728), the Radio Equipment 3 transfers the data to the Radio Equipment Controller 2 (#729).

Upon receiving the data to be directed to the upper-level device from the Radio Equipment 3 (Yes in #710 of FIG. 18), the Radio Equipment Controller 2 transfers the data to the upper-level device (#712). At this time, the Radio Equipment Controller 2 delays a time at which the data is transferred based on the uplink delay time TU relating to the Radio Equipment 3 that has relayed the data and the antenna 33 thereof (#711).

As compared to the conventional technology, this embodiment makes it possible to improve the communication accuracy in a Base Transceiver Station, more particularly, a Base Transceiver Station having the MIMO function.

In this embodiment, the description is given of the Base Transceiver Station 1 having the MIMO function. Instead, the embodiment is also applicable to the case in which the MIMO function is not used in a Base Transceiver Station.

During the operation of the Base Transceiver Station 1, the RE downlink delay time TB and the RE uplink delay time TC corresponding to each of the antennas 33 of each piece of Radio Equipment 3 may change. In view of this, another configuration is possible in which patterns of the RE downlink delay time TB and the RE uplink delay time TC are registered in advance, and the RE downlink delay time TB and the RE uplink delay time TC are appropriately used by the selector (see FIG. 3) depending on the change.

In the embodiment discussed above, the overall configuration of the Base Transceiver Station 1, the Radio Equipment Controller 2, the Radio Equipment 3, the configurations of various portions thereof, the content to be processed, the processing order, the configuration of the databases, and the like may be altered as required in accordance with the subject matter of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio equipment controller connected to a plurality of pieces of radio equipment for performing communication with a mobile station, and also connected to an upper-level device, the radio equipment controller being connected to the plurality of pieces of radio equipment via a plurality of transmission paths, the radio equipment controller comprising:
    a required time measurement portion that measures, for each piece of radio equipment, required time for the radio equipment and the radio equipment controller to relay data that has a predetermined size and is transmitted and received between the upper-level device and the mobile station; and
    a relaying portion that relays target data that is data to be transmitted and received between the upper-level device and the mobile station by delaying a time to transmit the target data based on the required time for the radio equipment relaying the target data,
    wherein the required time measurement portion measures, for each piece of radio equipment, the required time based on
    a first time that is time necessary for data that has a predetermined size to be transmitted from the radio equipment controller to the radio equipment and back from the radio equipment to the radio equipment controller, and
    a second time that is the delay from when data that has a predetermined size is received by the radio equipment until the data is transmitted between the radio equipment controller and the mobile station.

2. The radio equipment controller according to claim 1, further comprising a receiving portion that receives, from the radio equipment, a frame including information about the second time in a predetermined area of the frame based on Common Public Radio Interface standards,
    wherein the required time measurement portion measures the required time based on the second time included in the predetermined area of the frame thus received.

3. The radio equipment controller according to claim 2, wherein the predetermined area is a Vender Specific area.

4. The radio equipment controller according to claim 1, wherein
    the radio equipment includes a plurality of antennas and a Multiple Input Multiple Output function,
    the required time measurement portion measures the required time for each of the plurality of antennas of the radio equipment, and the relaying portion relays the target data by delaying a time to transmit the target data based on the required time for the radio equipment relaying the target data and the required time for the antenna of the radio equipment.

5. The radio equipment controller according to claim 1, wherein the required time measurement portion measures, as the required time, uplink required time for the data that has a predetermined size to be relayed in an downlink direction from the radio equipment controller to the radio equipment, and downlink required time for the data that has a predetermined size to be relayed in an uplink direction from the radio equipment to the radio equipment controller, and when relaying the target data in the downlink direction, the relaying portion relays the target data by delaying a time to transmit the target data based on the downlink required time, and when relaying the target data in the uplink direction, the relaying portion relays the target data by delaying a time to transmit the target data based on the uplink required time.

6. A base transceiver station comprising:

a plurality of pieces of radio equipment; and a radio equipment controller that controls the plurality of pieces of radio equipment, wherein the plurality of pieces of radio equipment are connected to the radio equipment controller via a plurality of transmission paths, each of the plurality of pieces of radio equipment includes a second time measurement portion that measures a second time that is the delay from when data that has a predetermined size is received by the radio equipment until the data is transmitted between the radio equipment controller and a mobile station, and an informing portion that informs the radio equipment controller of the second time thus measured, the radio equipment controller includes a first time measurement portion that measures, for each piece of radio equipment, a first time that is time necessary for data that has a predetermined size to be transmitted from the radio equipment controller to the radio equipment and back from the radio equipment to the radio equipment controller, a required time calculation portion that calculates, for each piece of radio equipment, required time for the radio equipment and the radio equipment controller to relay data that has a predetermined size and is transmitted and received between an upper-level device and the mobile station based on the first time and the second time for the radio equipment, and a relaying portion that relays target data that is data to be transmitted and received between the upper-level device and the mobile station by delaying a time to transmit the target data based on the required time for the radio equipment relaying the target data.

7. A method for relaying data in a base transceiver station, the base transceiver station including a plurality of pieces of radio equipment and a radio equipment controller, the radio equipment controller being connected to the plurality of pieces of radio equipment via a plurality of transmission paths to control the plurality of pieces of radio equipment, the method comprising causing the radio equipment controller to perform a process comprising:

measurement processing of measuring, for each piece of radio equipment, required time for the radio equipment and the radio equipment controller to relay data that has a predetermined size and is transmitted and received between an upper-level device and a mobile station; and relay processing of relaying target data that is data to be transmitted and received between the upper-level device and the mobile station by delaying a time to transmit the target data based on the required time for the radio equipment relaying the target data, wherein the measurement processing measures, for each piece of radio equipment, the required time based on a first time that is time necessary for data that has a predetermined size to be transmitted from the radio equipment controller to the radio equipment and back from the radio equipment to the radio equipment controller, and a second time that is the delay from when data that has a predetermined size is received by the radio equipment until the data is transmitted between the radio equipment controller and the mobile station.

* * * * *